(12) United States Patent
Han et al.

(10) Patent No.: US 9,319,704 B2
(45) Date of Patent: *Apr. 19, 2016

(54) METHOD AND APPARATUS FOR DECODING VIDEO ACCORDING TO INDIVIDUAL PARSING OR DECODING IN DATA UNIT LEVEL, AND METHOD AND APPARATUS FOR ENCODING VIDEO FOR INDIVIDUAL PARSING OR DECODING IN DATA UNIT LEVEL

(71) Applicant: SAMSUNG ELECTRONICS CO., LTD., Suwon-si (KR)

(72) Inventors: Woo-jin Han, Suwon-si (KR); Jung-hye Min, Suwon-si (KR); Il-koo Kim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,356

(22) Filed: Nov. 4, 2013

(65) Prior Publication Data

US 2014/0056360 A1     Feb. 27, 2014

Related U.S. Application Data

(63) Continuation of application No. 12/911,087, filed on Oct. 25, 2010, now Pat. No. 8,594,183.

(30) Foreign Application Priority Data

Oct. 23, 2009    (KR) .................. 10-2009-0101190

(51) Int. Cl.
*H04N 7/12*      (2006.01)
*H04N 19/52*     (2014.01)
(Continued)

(52) U.S. Cl.
CPC ......... *H04N 19/52* (2014.11); *H04N 19/00684* (2013.01); *H04N 19/119* (2014.11);
(Continued)

(58) Field of Classification Search
USPC .......................... 375/240.16, 240.01
See application file for complete search history.

(56) References Cited

U.S. PATENT DOCUMENTS 8,086,052 B2    12/2011   Toth et al.
8,363,936 B2     1/2013   Divorra Escoda et al.
(Continued)

FOREIGN PATENT DOCUMENTS

CN          1857001 A    11/2006
CN     101507280 A     8/2009
(Continued)

OTHER PUBLICATIONS

International Search Report (PCT/ISA/210) and Written Opinion (PCT/ISA/237) dated Jun. 10, 2011, in International Application No. PCT/KR2010/007259.
(Continued)

*Primary Examiner* — Christopher S Kelley
*Assistant Examiner* — Ana Picon-Feliciano
(74) *Attorney, Agent, or Firm* — Sughrue Mion, PLLC

(57) ABSTRACT

A video decoding method including: extracting, from a bitstream of an encoded video, at least one of information indicating independent parsing of a data unit and information indicating independent decoding of a data unit; extracting encoded video data and information about a coded depth and an encoding mode according to maximum coding units by parsing the bitstream based on the information indicating independent parsing of the data unit; and decoding at least one coding unit according to a coded depth of each maximum coding unit of the encoded video data, based on the information indicating independent decoding in the data unit and the information about the coded depth and the encoding mode according to maximum coding units.

2 Claims, 22 Drawing Sheets

(51) Int. Cl.
| | |
|---|---|
| H04N 19/51 | (2014.01) |
| H04N 19/176 | (2014.01) |
| H04N 19/70 | (2014.01) |
| H04N 19/119 | (2014.01) |
| H04N 19/46 | (2014.01) |
| H04N 19/513 | (2014.01) |
| H04N 19/122 | (2014.01) |
| H04N 19/61 | (2014.01) |
| H04N 19/174 | (2014.01) |
| H04N 19/436 | (2014.01) |
| H04N 19/139 | (2014.01) |
| H04N 19/146 | (2014.01) |
| H04N 19/43 | (2014.01) |
| H04N 19/44 | (2014.01) |

(52) U.S. Cl.
CPC ........... *H04N19/122* (2014.11); *H04N 19/139* (2014.11); *H04N 19/146* (2014.11); *H04N 19/174* (2014.11); *H04N 19/176* (2014.11); *H04N 19/43* (2014.11); *H04N 19/436* (2014.11); *H04N 19/44* (2014.11); *H04N 19/46* (2014.11); *H04N 19/513* (2014.11); *H04N 19/61* (2014.11); *H04N 19/70* (2014.11)

(56) References Cited

U.S. PATENT DOCUMENTS

| | | | |
|---|---|---|---|
| 8,976,870 B1 * | 3/2015 | Cismas | 375/240.24 |
| 2003/0007667 A1 | 1/2003 | Ernst et al. | |
| 2004/0258162 A1 * | 12/2004 | Gordon et al. | 375/240.25 |
| 2005/0114093 A1 | 5/2005 | Cha et al. | |
| 2006/0251330 A1 | 11/2006 | Toth et al. | |
| 2007/0237240 A1 | 10/2007 | Lee et al. | |
| 2008/0013624 A1 | 1/2008 | Han | |
| 2008/0253463 A1 * | 10/2008 | Lin et al. | 375/240.25 |
| 2009/0003446 A1 * | 1/2009 | Wu et al. | 375/240.16 |
| 2009/0196517 A1 | 8/2009 | Divorra Escoda et al. | |
| 2010/0080285 A1 * | 4/2010 | Lee et al. | 375/240.02 |
| 2010/0080296 A1 * | 4/2010 | Lee et al. | 375/240.16 |
| 2010/0086029 A1 | 4/2010 | Chen et al. | |
| 2010/0086031 A1 | 4/2010 | Chen et al. | |
| 2010/0086032 A1 * | 4/2010 | Chen et al. | 375/240.12 |
| 2011/0158319 A1 | 6/2011 | Bae et al. | |
| 2012/0243603 A1 | 9/2012 | Lu et al. | |

FOREIGN PATENT DOCUMENTS

| | | |
|---|---|---|
| KR | 1020000053028 A | 8/2000 |
| KR | 10-2005-0045746 A | 5/2005 |
| KR | 10-2006-0027795 A | 3/2006 |
| KR | 1020070026289 A | 3/2007 |
| KR | 100736104 B1 | 7/2007 |
| KR | 10-0842558 B1 | 6/2008 |
| KR | 10-2009-0096143 A | 9/2009 |

OTHER PUBLICATIONS

Communication dated May 12, 2014 issued by the Korean Intellectual Property Office in counterpart Korean Patent Application No. 10-2009-0101190.

Communication dated May 29, 2014 issued by the State Intellectual Property Office of P.R. China in counterpart Chinese Patent Application No. 201080047879.5.

Communication dated Dec. 17, 2014, issued by the Korean Intellectual Property Office in counterpart Korean Application No. 10-2009-0101190.

Communication from the Korean Intellectual Property Office dated Mar. 24, 2015 in a counterpart Korean application No. 10-2014-0054297.

Communication from the Korean Intellectual Property Office dated Jun. 1, 2015 in a counterpart Korean application No. 10-2015-0056015.

Communication from the State Intellectual Property Office of P.R. China dated Aug. 20, 2015 in a counterpart Chinese application No. 201410542345.X.

Communication dated Dec. 2, 2015, issued by the Korean Intellectual Property Office in counterpart Korean Application No. 10-2014-0054297.

Communication dated Dec. 2, 2015, issued by the Korean Intellectual Property Office in counterpart Korean Application No. 10-2014-0148720.

Communication dated Dec. 2, 2015, issued by the Korean Intellectual Property Office in counterpart Korean Application No. 10-2015-0056013.

Communication dated Dec. 2, 2015, issued by the Korean Intellectual Property Office in counterpart Korean Application No. 10-2015-0056014.

* cited by examiner

CODING UNITS (1010)

|  |  | CASE 1 | CASE 2 | CASE 3 | CASE 4 | CASE 5 |
|---|---|---|---|---|---|---|
| PARALLEL PROCESS IN SLICE LEVEL | | O | O | O | X | X |
| CODING UNIT LEVEL | PARALLEL PARSING | X | O | X | O | X |
| | PARALLEL DECODING | X | X | O | O | O |

FIG. 24

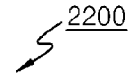

```
sequence_parameter_set(){
  picture_width
  picture_height
  max_coding_unit_size
  max_coding_unit_depth
  use_independent_cu_decode_flag
  use_independent_cu_parse_flag
  use_mv_accuracy_control_flag
  use_arbitrary_direction_intra_flag
  use_frequency_domain_prediction_flag
  use_rotational_transform_flag
  use_tree_significant_map_flag
  use_multi_parameter_intra_prediction_flag
  use_advanced_motion_vector_prediction_flag
  use_adaptive_loop_filter_flag
  use_quadtree_adaptive_loop_filter_flag
  use_delta_qp_flag
  use_random_noise_generation_flag
  use_arbitrary_motion_partition_flag
  for( uiDepth = 0; uiDepth < max_coding_unit_depth; uiDepth++ ){
        mvp_mode[uiDepth]
        significant_map_mode[uiDepth]
  }
  input_sample_bit_depth
  internal_sample_bit_depth
  if( use_adaptive_loop_filter_flag && !use_quadtree_adaptive_loop_filter_flag ){
  alf_filter_length
  alf_filter_type
  alf_qbits
  alf_num_color
  }
}
```

METHOD AND APPARATUS FOR DECODING VIDEO ACCORDING TO INDIVIDUAL PARSING OR DECODING IN DATA UNIT LEVEL, AND METHOD AND APPARATUS FOR ENCODING VIDEO FOR INDIVIDUAL PARSING OR DECODING IN DATA UNIT LEVEL

CROSS-REFERENCE TO RELATED PATENT APPLICATION

This is a Continuation of U.S. patent application Ser. No. 12/911,087, filed Oct. 25, 2010, which claims priority from Korean Patent Application No. 10-2009-0101190, filed on Oct. 23, 2009 in the Korean Intellectual Property Office, the disclosure of which is incorporated herein in its entirety by reference.

BACKGROUND

1. Field

Apparatuses and methods consistent with exemplary embodiments relate to encoding and decoding a video.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded or decoded according to a limited encoding method based on a macroblock having a predetermined size. Macroblocks are sequentially encoded or decoded, and prediction encoding or decoding that refers to nearby information is widely used.

SUMMARY

One or more exemplary embodiments provide encoding a video according to an independent encoding in a predetermined data unit level, and decoding a video according to independent parsing or independent decoding in a predetermined data unit level.

According to an aspect of an exemplary embodiment, there is provided a video decoding method including: extracting, from a bitstream of an encoded video, at least one of information indicating independent parsing of a data unit and information indicating independent decoding of a data unit; extracting encoded video data and information about a coded depth and an encoding mode according to maximum coding units by parsing the bitstream based on the information indicating independent parsing of the data unit; and decoding at least one coding unit according to a coded depth of each maximum coding unit of the encoded video data, based on the information indicating independent decoding of the data unit and the information about the coded depth and the encoding mode according to maximum coding units. The data unit includes one of a group of at least one coding unit and a group of at least one maximum coding unit.

The coding unit may be characterized by a maximum size and a depth.

The depth may denote a number of times a coding unit is hierarchically split, and as the depth deepens, deeper coding units according to depths may be split from the maximum coding unit to obtain minimum coding units, wherein the depth is deepened from an upper depth to a lower depth, wherein as the depth deepens, the number of times the maximum coding unit is split increases, and a total number of possible times the maximum coding unit is split corresponds to a maximum depth, and wherein the maximum size and a maximum depth of the coding unit may be predetermined.

The information indicating independent parsing of the data unit may include information indicating independent parsing in a coding unit level, which indicates whether it is possible to extract information independently encoded for each maximum coding unit from the bitstream, and the information indicating independent decoding of the data unit may include information indicating independent decoding in a coding unit level, which indicates whether it is possible to decode data independently encoded for each maximum coding unit.

The information indicating independent parsing in the coding unit level and the information indicating independent decoding in the coding unit level may be set independently from each other.

The decoding may include, if predetermined nearby information is not referenceable to perform prediction decoding on the at least one coding unit because the predetermined nearby information is not decoded before the at least one coding unit, performing prediction encoding on the at least one coding unit by searching for and referring to referenceable nearby information, according to the information indicating independent parsing of the data unit and the information indicating independent decoding of the data unit.

The decoding may include, if only a partial region of the encoded video is to be decoded, decoding only at least one maximum coding unit of the encoded video data, which corresponds to the partial region, based on the information indicating independent encoding in the coding unit level. Information indicating whether to perform partial region decoding on the data unit or information indicating target data unit of the partial region decoding may be extracted from the bitstream.

The video decoding method may further include restoring and reproducing video data, which is decoded in parallel per a predetermined number of coding units in the coding unit level, in parallel in the coding unit level, based on the information indicating independent encoding in the coding unit level.

The performing the prediction decoding may include, if current nearby information of the at least one coding unit is not referenceable, decoding the at least one coding unit by using another piece of currently referenceable nearby information by the at least one coding unit, or information about a current coding unit, so as to perform at least one of intra prediction, inter prediction, frequency domain prediction decoding, entropy decoding according to context-based adaptive binary arithmetic coding (CABAC), and a post process of intra prediction value on the at least one coding unit.

The information regarding the data unit indicating a size of the coding unit or the number of the group of at least one coding unit or the number of the group of at least one maximum coding unit may be extracted from the bitstream.

The information indicating independent parsing of the data unit or the information indicating independent decoding of the data unit may be extracted from a slice header of the bitstream or a sequence parameter set.

According to an aspect of another exemplary embodiment, there is provided a video encoding method including: splitting a current picture into at least one maximum coding unit; determining an encoding depth and a coding unit corresponding to the encoding depth to output a result of encoding video data of the at least one maximum coding unit based on deeper coding units having a hierarchical structure, in which a coding unit of an upper depth is split as a depth deepens, according to at least one split region of the at least one maximum coding unit; and outputting a bitstream including video data encoded in the encoding depth for each of the at least one maximum coding unit, information about a coded depth and an encoding mode according to the at least one maximum coding unit, and at least one of information indicating independent parsing of a data unit and information indicating independent decoding of a data unit.

The outputting the bitstream may include setting the information indicating independent decoding of the data unit based on whether the data unit is independently encoded while encoding the video data to determine the encoding depth.

The outputting the bitstream may include setting the information indicating independent parsing of the data unit based on whether the encoded video data and the information about the coded depth and the encoding mode according to at least one maximum coding unit are independently inserted into the bitstream for each data unit. The information regarding the data unit indicating a size of the coding unit or the number of the group of at least one coding unit or the number of the group of at least one maximum coding unit may be inserted into the bitstream.

The determining the encoding depth and the coding unit may include, if reference information used to perform prediction encoding on the coding unit is not information about a previous coding unit as the coding unit is independently encoded in the coding unit level, searching for and referring to referenceable nearby information from among nearby information encoded before the coding unit so as to predict the coding unit.

The searching for and referring to the nearby information may include referring to nearby information that is encoded before a current coding unit from among the nearby information, or to information about the current coding unit, when intra prediction, frequency domain prediction encoding, inter prediction, a post process after intra prediction, or entropy encoding according to CABAC is performed on the coding unit.

The video encoding method and the video decoding method may process the coding units in parallel simultaneously per a plurality of coding units by using a plurality of independent processors.

According to an aspect of another exemplary embodiment, there is provided a video decoding apparatus including: a receiver which extracts, from a bitstream of an encoded video, at least one of information indicating independent parsing of a data unit and information indicating independent decoding of a data unit; a parser which extracts encoded video data and information about a coded depth and an encoding mode according to maximum coding units by parsing the bitstream based on the information indicating independent parsing of the data unit; and a decoder which decodes at least one coding unit according to coded depth of each maximum coding unit of the encoded video data, based on the information indicating independent decoding of the data unit and the information about the coded depth and the encoding mode according to maximum coding units.

According to an aspect of another exemplary embodiment, there is provided a video encoding apparatus including: a maximum coding unit splitter which splits a current picture into at least one maximum coding unit; a coding unit determiner which determines an encoding depth and a coding unit corresponding to the encoding depth to output a result of encoding video data of the at least one maximum coding unit based on deeper coding units having a hierarchical structure, in which a coding unit of an upper depth is split as a depth deepens, according to at least one split region of the at least one maximum coding unit; and an output unit which outputs a bitstream including video data encoded in the encoding depth for each of the at least one maximum coding unit, information about a coded depth and an encoding mode according to the at least one maximum coding unit, and at least one of information indicating independent parsing of a data unit and information indicating independent decoding of a data unit.

According to an aspect of another exemplary embodiment, there is provided a video decoding method including: extracting, from a bitstream, encoded video data and information about a coded depth and an encoding mode according to maximum coding units by parsing the bitstream based on information indicating independent parsing of a data unit; and decoding at least one coding unit according to a coded depth of each maximum coding unit of the encoded video data, based on information indicating independent decoding of a data unit and the information about the coded depth and the encoding mode according to maximum coding units.

According to an aspect of another exemplary embodiment, there is provided a computer readable recording medium having recorded thereon a program for executing the video decoding method.

According to an aspect of another exemplary embodiment, there is provided a computer readable recording medium having recorded thereon a program for executing the video encoding method.

BRIEF DESCRIPTION OF THE DRAWINGS

The above and/or other aspects will become more apparent by describing in detail exemplary embodiments thereof with reference to the attached drawings in which:

FIG. 24 is a syntax of a sequence parameter set into which information indicating independent parsing in a coding unit level and information indicating independent decoding in a coding unit level are inserted, according to an exemplary embodiment;

DETAILED DESCRIPTION OF EXEMPLARY EMBODIMENTS

Hereinafter, the exemplary embodiments will be described more fully with reference to the accompanying drawings, in which exemplary embodiments are shown. Furthermore, expressions such as "at least one of," when preceding a list of elements, modify the entire list of elements and do not modify the individual elements of the list. In the exemplary embodiments, "unit" may or may not refer to a unit of size, depending on its context.

Hereinafter, a "coding unit" is an encoding data unit in which the image data is encoded at an encoder side and an encoded data unit in which the encoded image data is decoded at a decoder side, according to exemplary embodiments. Also, a "coded depth" denotes a depth where a coding unit is encoded.

Hereinafter, an "image" may denote a still image for a video or a moving image, that is, the video itself.

Video encoding and decoding in data units having a hierarchical tree structure according to exemplary embodiments will be described with reference to FIGS. 1 through 15. Video encoding and decoding considering independent parsing or independent decoding in a coding unit level based on the coding units having a hierarchical tree structure according to exemplary embodiments will be described with reference to FIGS. 16 through 30.

A video encoding apparatus, a video decoding apparatus, a video encoding method, and a video decoding method, according to exemplary embodiments, will now be described with reference to FIGS. 1 through 15.

Figure 1:
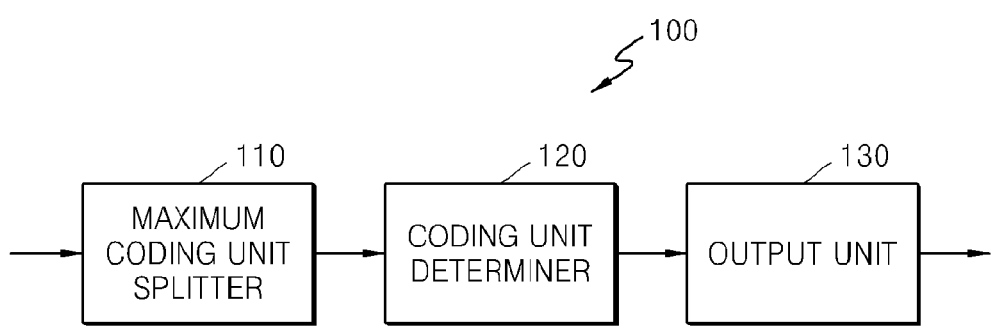
FIG. 1 is a block diagram of a video encoding apparatus, according to an exemplary embodiment.

FIG. 1 is a block diagram of a video encoding apparatus 100, according to an exemplary embodiment. Referring to FIG. 1, the video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output an encoded image data according to the at least one split region. That is, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is output to the output unit 130. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to a same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Therefore, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The coding units having a tree structure according to an exemplary embodiment include coding units corresponding to a depth determined to be the coded depth, from among deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of splitting times from a maximum coding unit to a minimum coding unit. A first maximum depth according to an exemplary embodiment may denote a total number of splitting times from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. Here, if the minimum coding unit is a coding unit in which the maximum coding unit is split four times, 5 depth levels of depths 0, 1, 2, 3 and 4 exist. Thus, the first maximum depth may be set to 4 and the second maximum depth may be set to 5.

Prediction encoding and transformation may be performed according to the maximum coding unit. The prediction encoding and the transformation are also performed based on the deeper coding units according to a depth equal to or depths less than the maximum depth, based on the maximum coding unit. Transformation may be performed according to a method of orthogonal transformation or integer transformation.

Since the number of deeper coding units increases whenever the maximum coding unit is split according to depths, encoding such as the prediction encoding and the transformation is performed on all of the deeper coding units generated as the depth deepens. For convenience of description, the prediction encoding and the transformation will hereinafter be described based on a coding unit of a current depth, in a maximum coding unit.

The video encoding apparatus 100 may variably select at least one of a size and a shape of a data unit for encoding the image data. In order to encode the image data, operations, such as prediction encoding, transformation, and entropy encoding, may be performed, and at this time, the same data unit may be used for all operations or different data units may be used for each operation.

For example, the video encoding apparatus 100 may select a coding unit for encoding the image data and a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will be referred to as a prediction unit. A partition obtained by splitting the prediction unit may include a prediction unit or a data unit obtained by splitting at least one of a height and a width of the prediction unit.

For example, when a coding unit of 2N2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting at least one of a height and a width of the prediction unit, partitions obtained by asymmetrically splitting the height or width of the prediction unit (such as 1:n or n:1), partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. In this case, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based on the coding unit for encoding the image data and on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will hereinafter be referred to as a transformation unit. A transformation depth indicating a number of splitting times to reach the transformation unit by splitting the height and the width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into 4 transformation units, and the size of the transformation unit is thus N×N, and may be 2 when each of the height and width of the current coding unit is split into four equal parts, totally split into $4^2$ transformation units and the size of the transformation unit is thus N/2×N/2. For example, the transformation unit may be set according to a hierarchical tree structure, in which a transformation unit of an upper transformation depth is split into four transformation units of a lower transformation depth according to hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth uses information about the coded depth and information related to prediction encoding and transformation. Accordingly, the coding unit determiner 120 determines a coded depth having a least encoding error and determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail below with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to the coded depth may include at least one of information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output. In this case, the split information may be defined to not split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. In this case, since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit of the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, a reference image index of the inter mode, a motion vector, a chroma component of an intra mode, and an interpolation method of the intra mode. Also, information about a maximum size of the coding unit defined according to pictures, slices, or GOPs, and information about a maximum depth may be inserted into at least one of a Sequence Parameter Set (SPS) and a header of a bitstream.

In the video encoding apparatus 100, the deeper coding unit may be a coding unit obtained by dividing at least one of a height and a width of a coding unit of an upper depth, which is one layer above, by two. For example, when the size of the coding unit of the current depth is 2N×2N, the size of the coding unit of the lower depth may be N×N. Also, the coding unit of the current depth having the size of 2N×2N may include a maximum of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or a large amount of data is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an exemplary embodiment, image compression efficiency may be increased since a coding unit is adjusted while considering characteristics of an image and increasing a maximum size of a coding unit while considering a size of the image.

Figure 2:
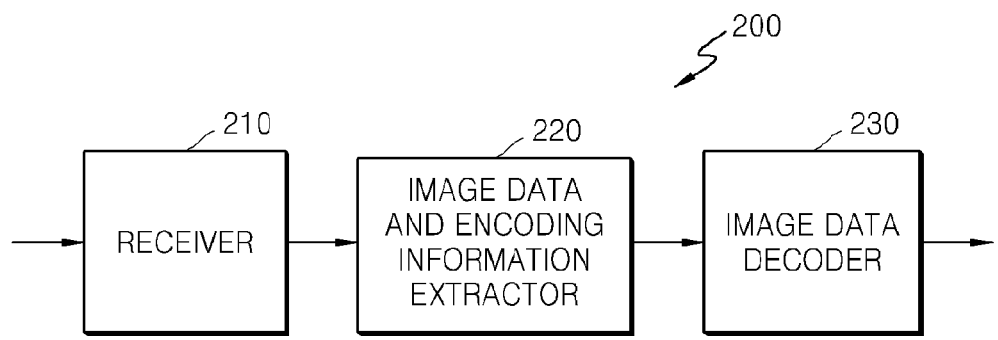
FIG. 2 is a block diagram of a video decoding apparatus, according to an exemplary embodiment.

FIG. 2 is a block diagram of a video decoding apparatus 200, according to an exemplary embodiment. Referring to FIG. 2, the video decoding apparatus 200 includes a receiver 210, an image data and encoding information extractor 220, and an image data decoder 230. Definitions of various terms, such as a coding unit, a depth, a prediction unit, and a transformation unit, and information about various encoding modes for various operations of the video decoding apparatus 200 are similar to those described with reference to FIG. 1.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or an SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. That is, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about at least one of a partition type of a corresponding coding unit corresponding to the coded depth, a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as a video encoding apparatus 100 according to an exemplary embodiment, repeatedly performs encoding for each deeper coding unit based on depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be the data units included in the same maximum coding unit.

The image data decoder 230 restores the current picture by decoding the image data in each maximum coding unit based on the information about the coded depth and the encoding mode according to the maximum coding units. For example, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to a method of inverse orthogonal transformation or inverse integer transformation.

The image data decoder 230 may perform at least one of intra prediction and motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using at least one of the information about the partition type of the prediction unit, the prediction mode, and the size of the transformation unit for each coding unit corresponding to the coded depth, and output the image data of the current maximum coding unit.

For example, data units including the encoding information having the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. That is, the coding units having the tree structure determined to be the optimum coding units in each maximum coding unit may be decoded. Also, the maximum size of the coding unit may be determined considering at least one of resolution and an amount of image data.

Accordingly, even if image data has high resolution and a large amount of data, the image data may be efficiently decoded and restored by using a size of a coding unit and an encoding mode, which are adaptively determined according to characteristics of the image data, and information about an optimum encoding mode received from an encoder.

A method of determining coding units having a tree structure, a prediction unit, and a transformation unit, according to one or more exemplary embodiments, will now be described with reference to FIGS. 3 through 13.

Figure 3:
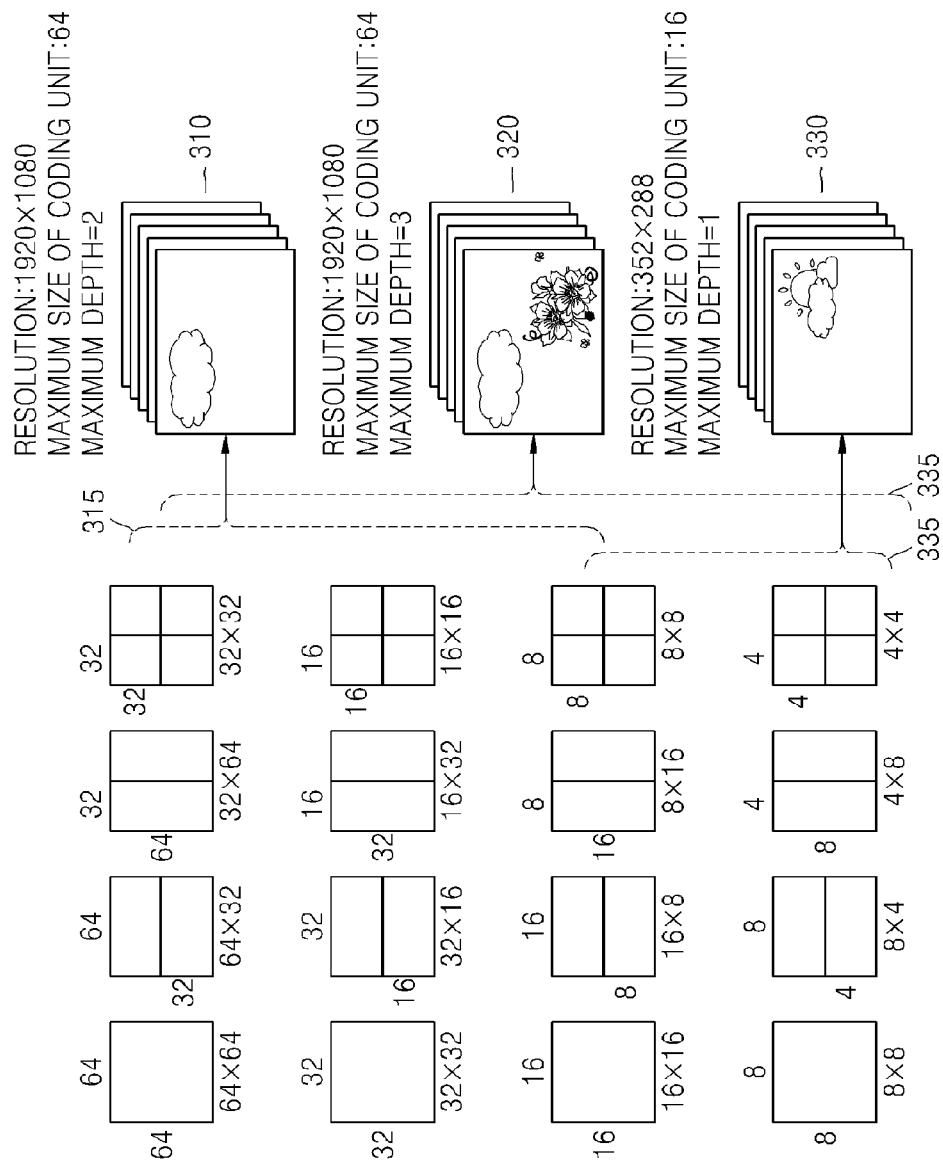
FIG. 3 is a diagram for describing a concept of coding units according to an exemplary embodiment.

FIG. 3 is a diagram for describing a concept of coding units according to an exemplary embodiment. A size of a coding unit may be expressed in width×height. For example, the size of the coding unit may be 64×64, 32×32, 16×16, or 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

Referring to FIG. 3, there is exemplarily provided first video data 310 with a resolution of 1920×1080 and a coding unit with a maximum size of 64 a maximum depth of 2. Furthermore, there is exemplarily provided second video data 320 with a resolution of 1920×1080 and a coding unit with a maximum size of 64 and a maximum depth of 3. Also, there is exemplarily provided third video data 330 with a resolution of 352×288 and a coding unit having a maximum size of 16 and a maximum depth of 1. The maximum depth shown in FIG. 3 denotes a total number of splits from a maximum coding unit to a minimum decoding unit.

If a resolution is high or a data amount is large, a maximum size of a coding unit may be large so as to increase encoding efficiency and to accurately reflect characteristics of an image. Accordingly, the maximum size of the coding unit of the first and second video data 310 and 320 having the higher resolution than the third video data 330 may be 64.

Since the maximum depth of the first video data 310 is 2, coding units 315 of the first video data 310 may include a maximum coding unit having a long axis size of 64, and coding units having long axis sizes of 32 and 16 since depths are deepened to two layers by splitting the maximum coding unit twice. Meanwhile, since the maximum depth of the third video data 330 is 1, coding units 335 of the third video data 330 may include a maximum coding unit having a long axis size of 16, and coding units having a long axis size of 8 since depths are deepened to one layer by splitting the maximum coding unit once.

Since the maximum depth of the second video data 320 is 3, coding units 325 of the second video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
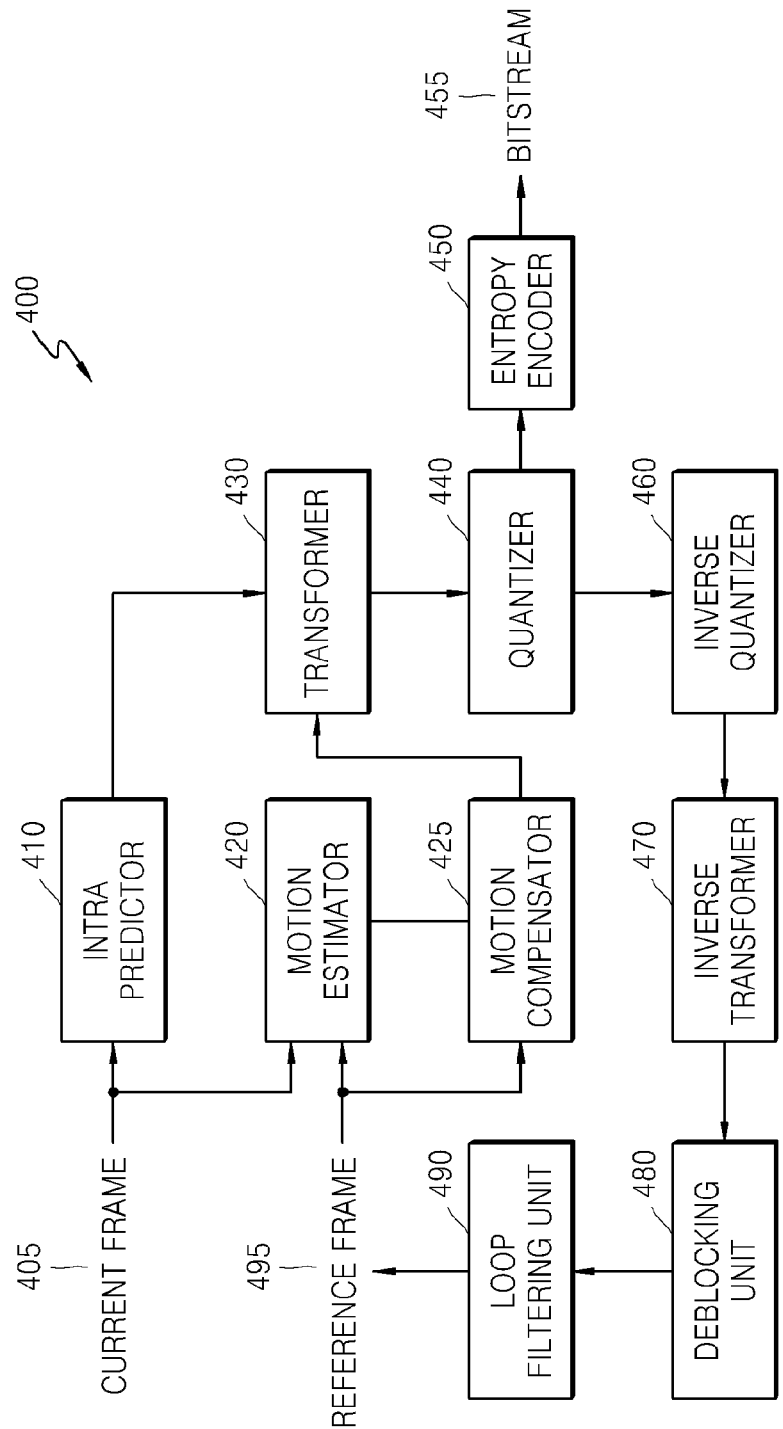
FIG. 4 is a block diagram of an image encoder based on coding units according to an exemplary embodiment.

FIG. 4 is a block diagram of an image encoder 400 based on coding units, according to an exemplary embodiment. The image encoder 400 may perform operations of a coding unit determiner 120 of a video encoding apparatus 100 according to an exemplary embodiment to encode image data. That is, referring to FIG. 4, an intra predictor 410 performs intra prediction on coding units, from among a current frame 405, in an intra mode, and a motion estimator 420 and a motion compensator 425 perform inter estimation and motion compensation on coding units, from among the current frame 405, in an inter mode by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering a maximum size and a maximum depth of a current maximum coding unit, and the transformer 430 determines the size of the transformation unit in each coding unit from among the coding units having a tree structure.

Figure 5:
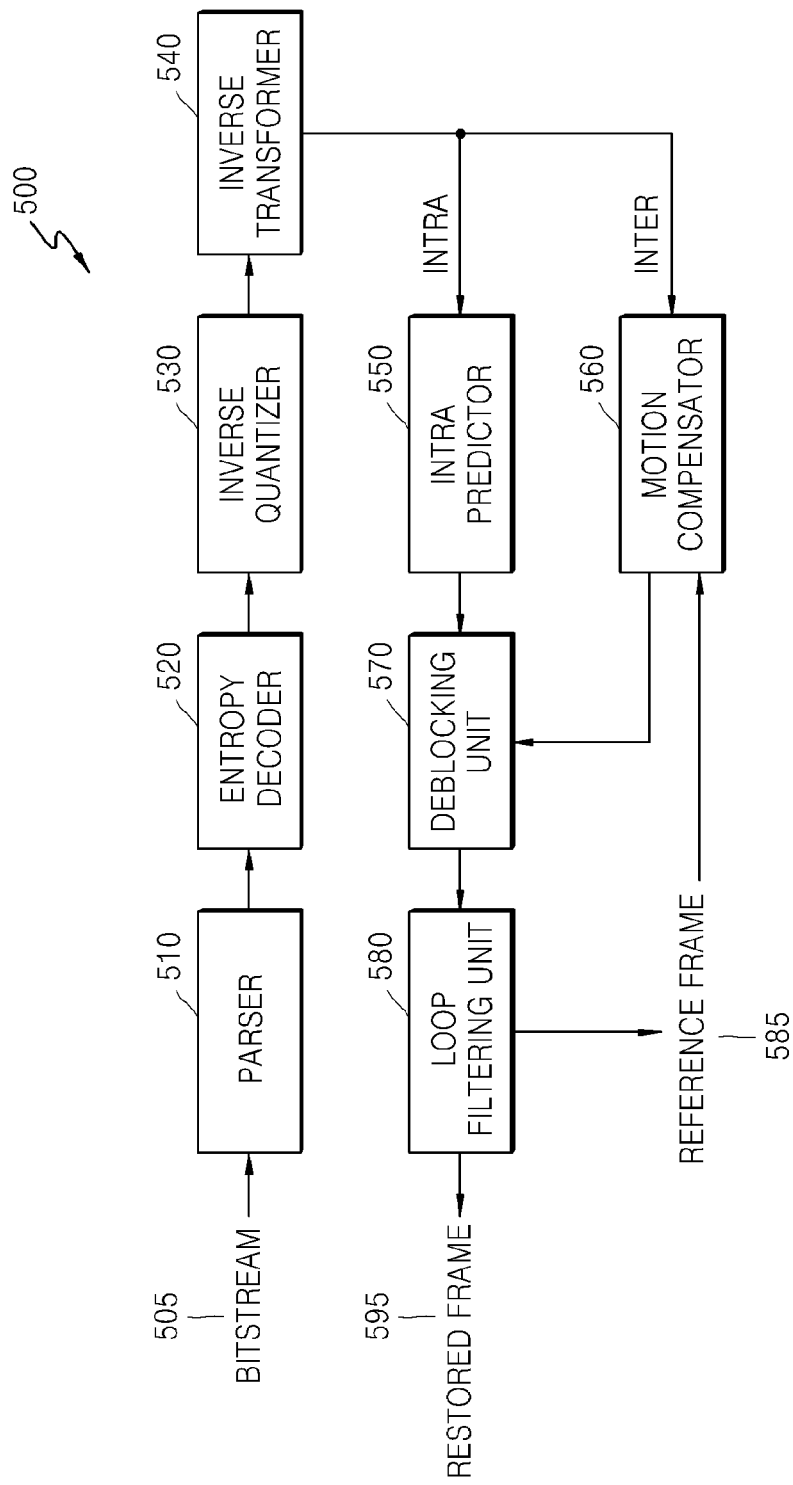
FIG. 5 is a block diagram of an image decoder based on coding units according to an exemplary embodiment.

FIG. 5 is a block diagram of an image decoder 500 based on coding units, according to an exemplary embodiment. Referring to FIG. 5, a parser 510 parses encoded image data to be decoded and information about encoding used for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in an image data decoder 230 of a video decoding apparatus 200 according to an exemplary embodiment, the image decoder 500 may perform operations that are performed after the parser 510. In order for the image decoder 500 to be applied in the video decoding apparatus 200, elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 performs operations based on a size of a transformation unit for each coding unit.

Figure 6:
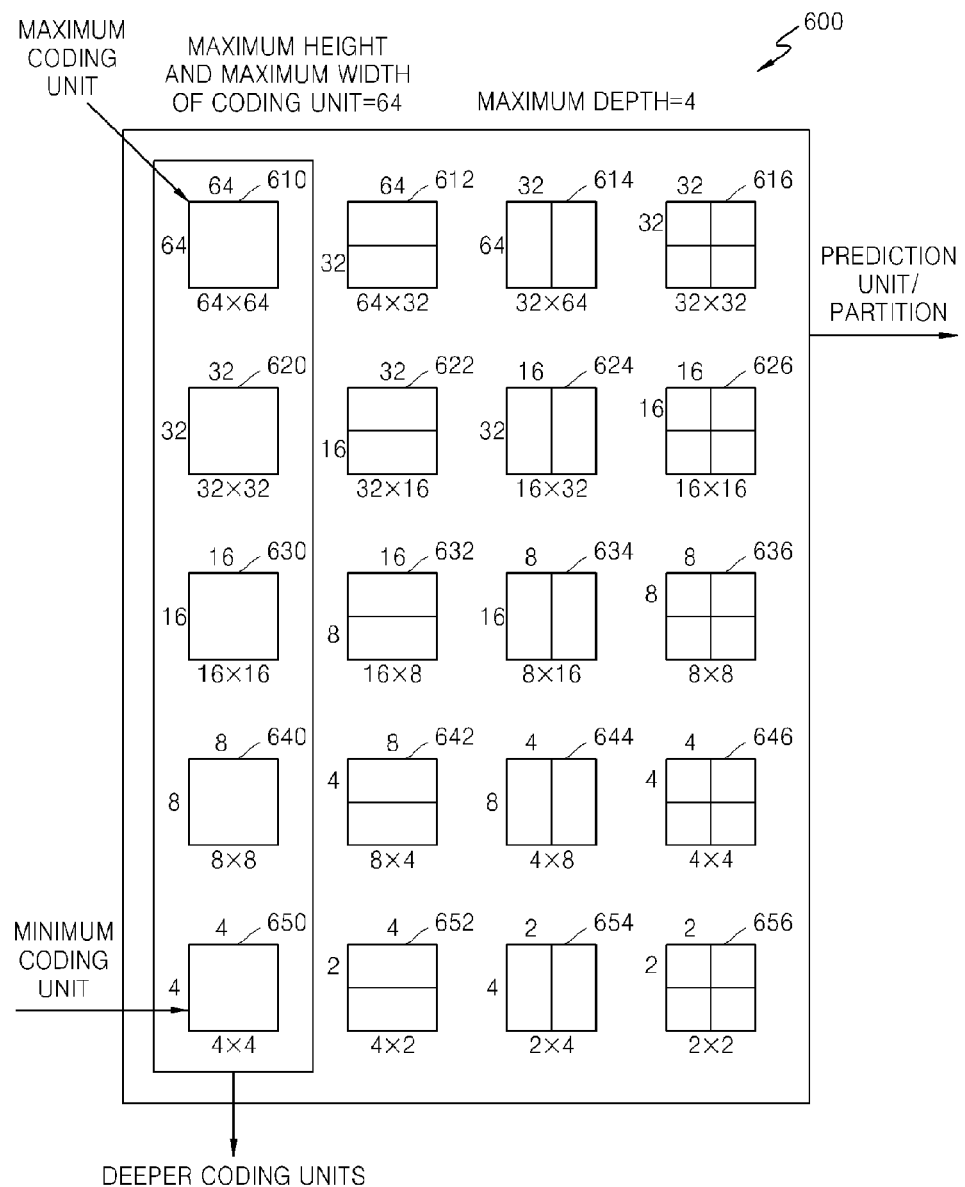
FIG. 6 is a diagram illustrating deeper coding units according to depths and partitions according to an exemplary embodiment.

FIG. 6 is a diagram illustrating deeper coding units according to depths, and partitions, according to an exemplary embodiment.

A video encoding apparatus 100 and a video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

Referring to FIG. 6, in a hierarchical structure 600 of coding units according to an exemplary embodiment, the maximum height and the maximum width of the coding units are each 64, and the maximum depth is 4. Since a depth deepens along a vertical axis of the hierarchical structure 600, a height and a width of a deeper coding unit are each split. Also, a prediction unit and partitions, which are bases for prediction encoding of each deeper coding unit, are shown along a horizontal axis of the hierarchical structure 600.

That is, a first coding unit 610 is a maximum coding unit in the hierarchical structure 600, wherein a depth is 0 and a size, i.e., a height by width, is 64×64. The depth deepens along the vertical axis, and a second coding unit 620 having a size of 32×32 and a depth of 1, a third coding unit 630 having a size of 16×16 and a depth of 2, a fourth coding unit 640 having a size of 8×8 and a depth of 3, and a fifth coding unit 650 having a size of 4×4 and a depth of 4 exist. The fifth coding unit 650 having the size of 4×4 and the depth of 4 is a minimum coding unit.

The prediction unit and the partitions of a coding unit are arranged along the horizontal axis according to each depth. That is, if the first coding unit 610 having the size of 64×64 and the depth of 0 is a prediction unit, the prediction unit may be split into partitions included in the first coding unit 610, i.e., a partition 610 having a size of 64×64, partitions 612 having a size of 64×32, partitions 614 having a size of 32×64, or partitions 616 having a size of 32×32.

Similarly, a prediction unit of the second coding unit 620 having the size of 32×32 and the depth of 1 may be split into partitions included in the second coding unit 620, i.e., a partition 620 having a size of 32×32, partitions 622 having a size of 32×16, partitions 624 having a size of 16×32, and partitions 626 having a size of 16×16.

Similarly, a prediction unit of the third coding unit 630 having the size of 16×16 and the depth of 2 may be split into partitions included in the third coding unit 630, i.e., a partition having a size of 16×16 included in the third coding unit 630, partitions 632 having a size of 16×8, partitions 634 having a size of 8×16, and partitions 636 having a size of 8×8.

Similarly, a prediction unit of the fourth coding unit 640 having the size of 8×8 and the depth of 3 may be split into partitions included in the fourth coding unit 640, i.e. a partition having a size of 8×8 included in the fourth coding unit 640, partitions 642 having a size of 8×4, partitions 644 having a size of 4×8, and partitions 646 having a size of 4×4.

The fifth coding unit 650 having the size of 4×4 and the depth of 4 is the minimum coding unit and a coding unit of the lowermost depth. A prediction unit of the fifth coding unit 650 is only assigned to a partition having a size of 4×4.

In order to determine the at least one coded depth of the coding units of the maximum coding unit 610, a coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are used to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the first coding unit 610 may be selected as the coded depth and a partition type of the first coding unit 610.

Figure 7:
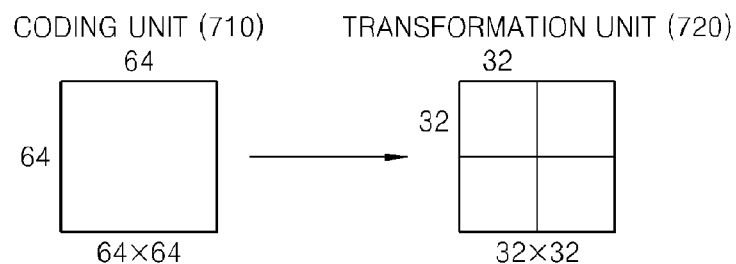
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

A video encoding or decoding apparatus 100 or 200 according to exemplary embodiments encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding or decoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, such that a transformation unit having the least coding error may be selected.

Figure 8:
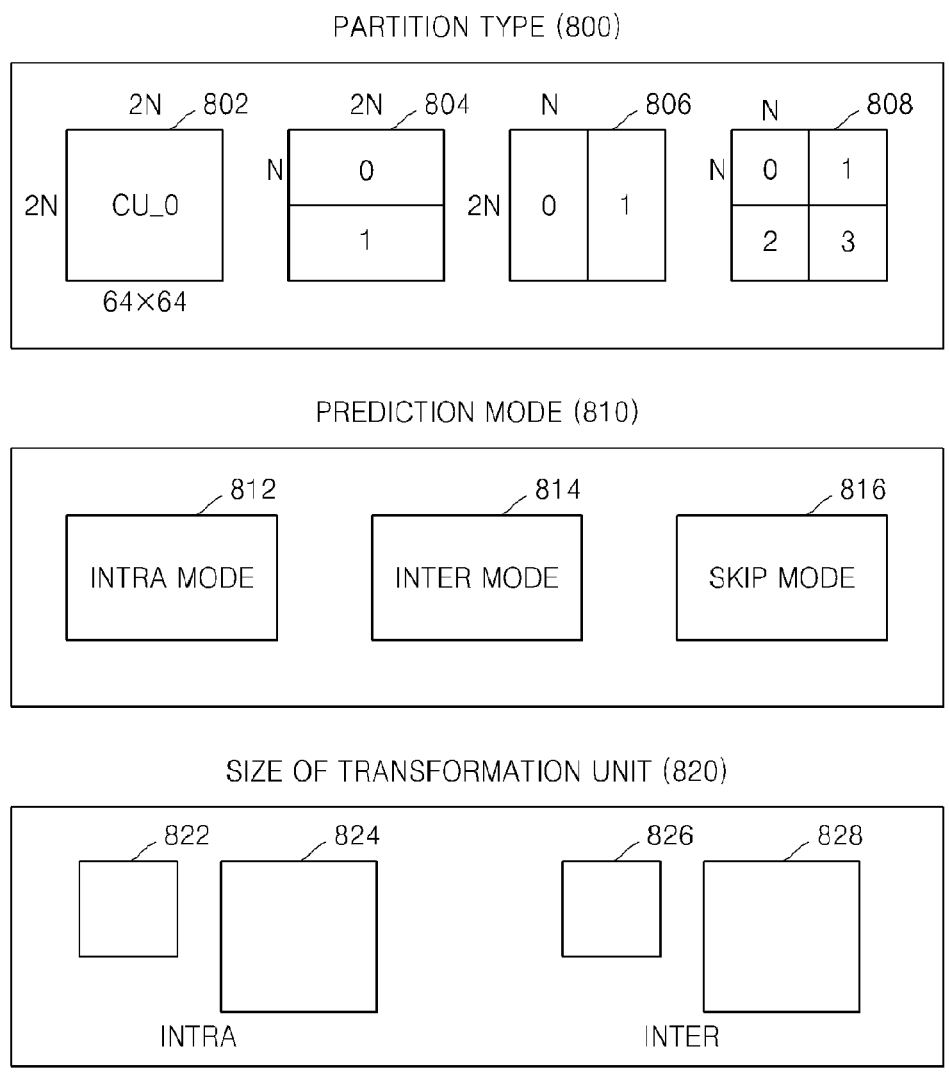
FIG. 8 is a diagram for describing encoding information of coding units corresponding to a coded depth, according to an exemplary embodiment.

FIG. 8 is a diagram for describing encoding information of coding units corresponding to a coded depth, according to an exemplary embodiment. Referring to FIG. 8, an output unit 130 of a video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 about the partition type is information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type is set to indicate one of the partition 804 having a size of 2N×N, the partition 806 having a size of N×2N, and the partition 808 having a size of N×N The information 810 about the prediction mode indicates a prediction mode of each partition. For example, the information 810 about the prediction mode may indicate a mode of prediction encoding performed on a partition indicated by the information 800 about the partition type, i.e., an intra mode 812, an inter mode 814, or a skip mode 816.

The information 820 about the size of a transformation unit indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
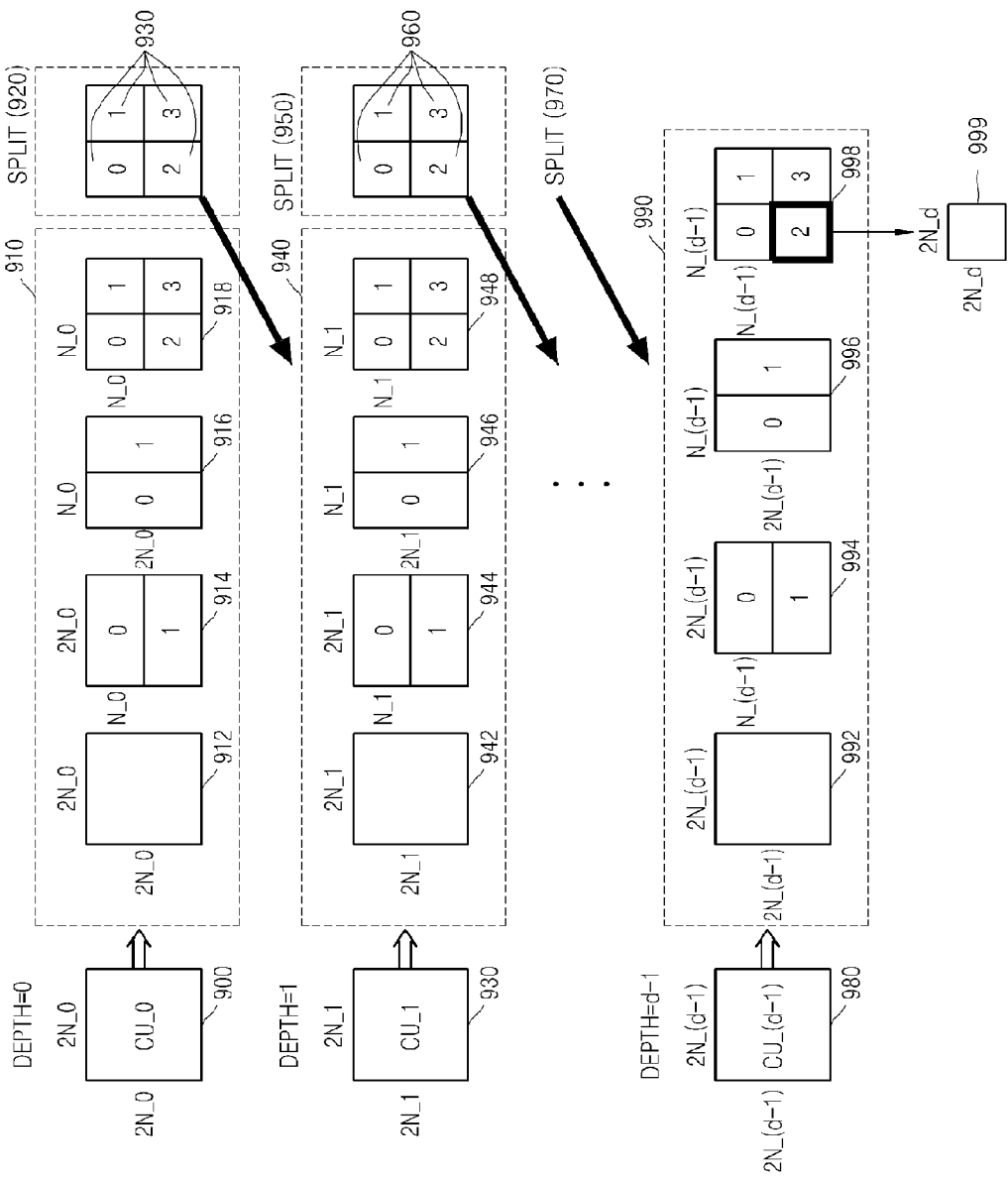
FIG. 9 is a diagram of deeper coding units according to depths, according to an exemplary embodiment.

An image data and encoding information extractor 220 of a video decoding apparatus 200 according to an exemplary embodiment may extract and use the information 800, 810, and 820 for decoding, according to each deeper coding unit FIG. 9 is a diagram of deeper coding units according to depths, according to an exemplary embodiment.

Split information may be used to indicate a change of a depth. The split information indicates whether a coding unit of a current depth is split into coding units of a lower depth.

Referring to FIG. 9, a prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0× N_0. Though FIG. 9 only illustrates the partition types 912 through 918 which are obtained by symmetrically splitting the prediction unit 910, it is understood that a partition type is not limited thereto. For example, according to another exemplary embodiment, the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

For example, if the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

As an example, if an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operations according to each depth may be performed up to when a depth becomes d−1, and split information may be encoded as up to when a depth is one of 0 to d−2. For example, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth. In this case, a coded depth for the coding units of a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a minimum unit for the current maximum coding unit. A minimum unit according to an exemplary embodiment may be a rectangular data unit obtained by splitting a minimum coding unit 980 by 4. By performing the encoding repeatedly, a video encoding apparatus 100 according to an exemplary embodiment may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, split information of the coded depth is set to 0, and split information of depths excluding the coded depth is set to 1.

An image data and encoding information extractor 220 of a video decoding apparatus 200 according to an exemplary embodiment may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
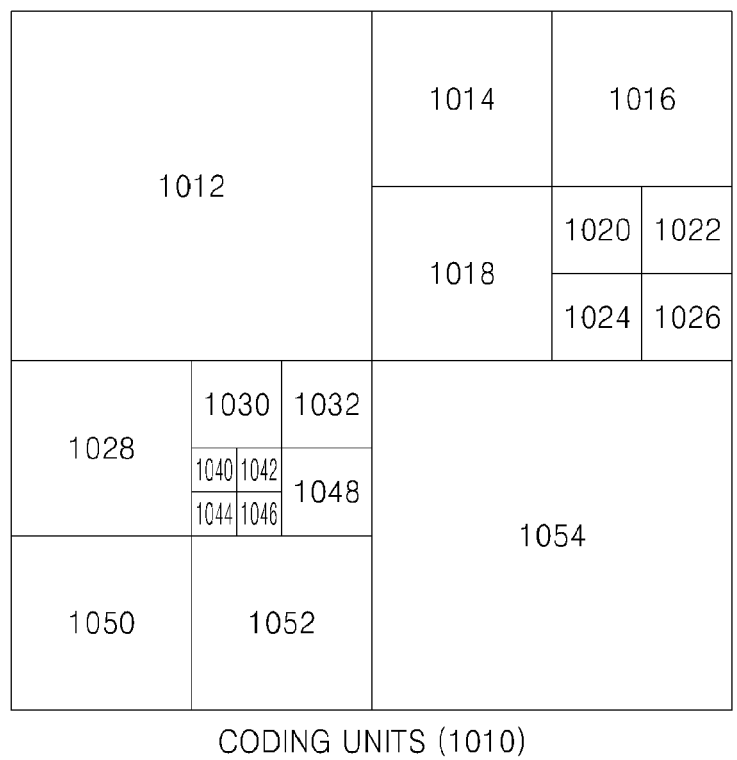
FIGS. 10 through 12 are diagrams for describing a relationship between coding units, prediction units, and transformation units, according to one or more exemplary embodiments.
Figure 11:
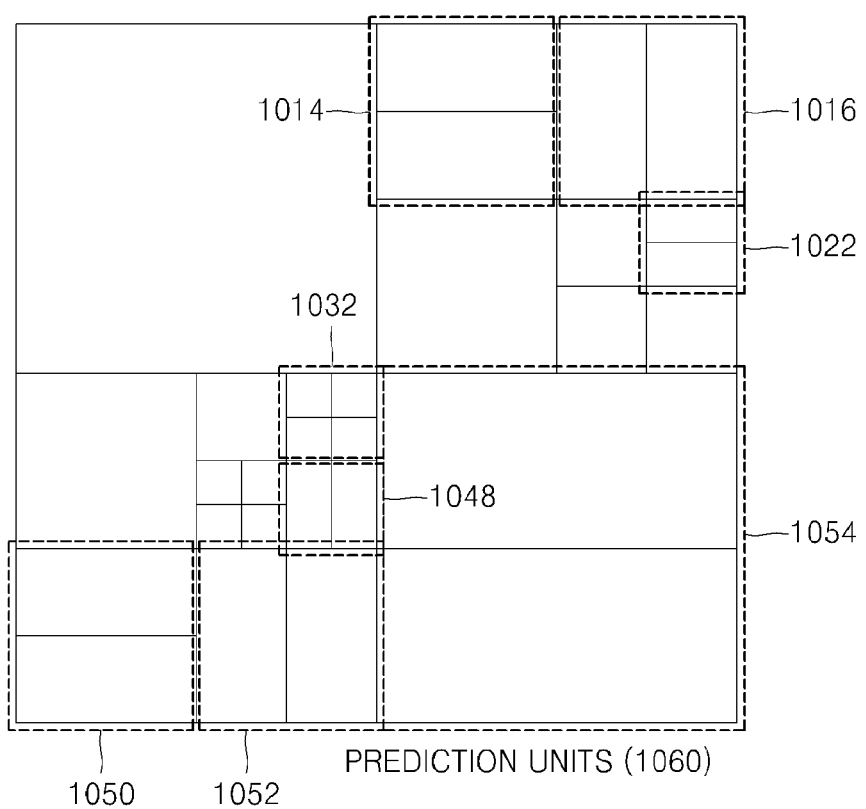
Figure 12:
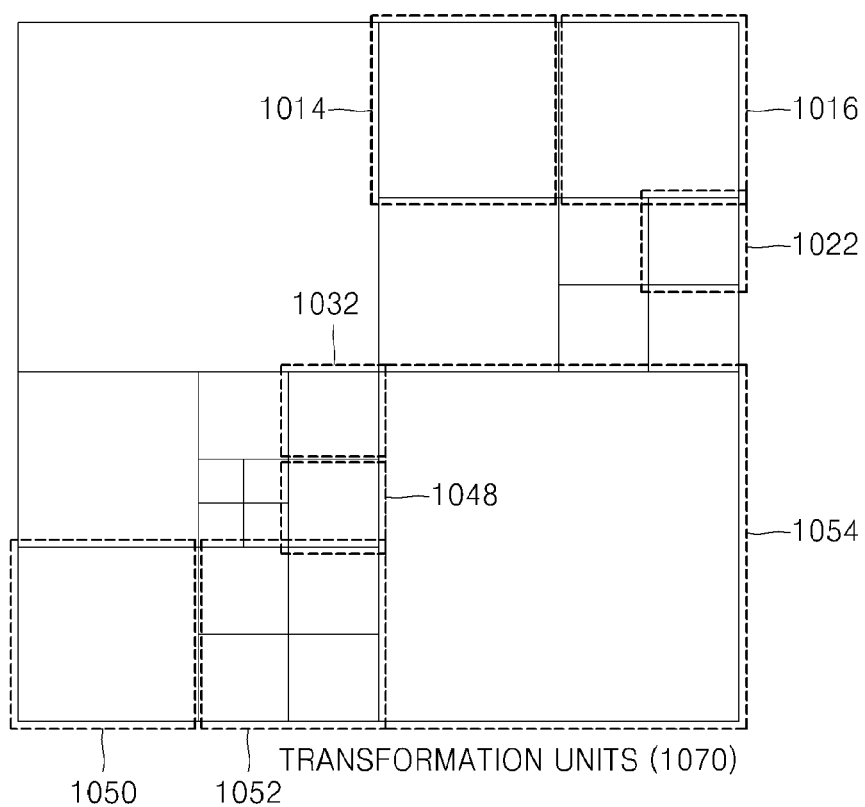

FIGS. 10 through 12 are diagrams for describing a relationship between coding units 1010, prediction units 1060, and transformation units 1070, according to one or more exemplary embodiments.

Referring to FIG. 10, the coding units 1010 are coding units having a tree structure, corresponding to coded depths determined by a video encoding apparatus 100 according to an exemplary embodiment, in a maximum coding unit. Referring to FIGS. 11 and 12, the prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting coding units of the coding units 1010. In particular, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 of the transformation units 1070 are different from those of the prediction units 1060 in terms of sizes and shapes. In other words, video encoding and decoding apparatuses 100 and 200 according to exemplary embodiments may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Exemplary Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transform Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transform Unit | Split Information 1 of Transform Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

An output unit 130 of the video encoding apparatus 100 may output the encoding information about the coding units having a tree structure, and an image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth in which a current coding unit is no longer split into a lower depth is a coded depth. Information about a partition type, prediction mode, and a size of a transformation unit may be defined for the coded depth. If the current coding unit is further split according to the split information, encoding is independently performed on split coding units of a lower depth.

A prediction mode may be one of an intra mode, an inter mode, and a skip mode. The intra mode and the inter mode may be defined in all partition types, and the skip mode may be defined in only a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or the width of the prediction unit. The asymmetrical partition types having the sizes of 2N×nU and 2N×nD may be respectively obtained by splitting the height of the prediction unit in ratios of 1:3 and 3:1, and the asymmetrical partition types having the sizes of nL×2N and nR×2N may be respectively obtained by splitting the width of the prediction unit in ratios of 1:3 and 3:1

The size of the transformation unit may be set to be two types in the intra mode and two types in the inter mode. For example, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a coding unit corresponding to a prediction unit, and a coding unit corresponding to a minimum unit. The coding unit corresponding to the coded depth may include at least one of a prediction unit and a minimum unit including the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used. However, it is understood that another exemplary embodiment is not limited thereto. For example, according to another exemplary embodiment, if a current coding unit is predicted based on encoding information of adjacent data units, data units adjacent to the current coding unit are searched using encoded information of the data units, and the searched adjacent coding units may be referred for predicting the current coding unit.

Figure 13:
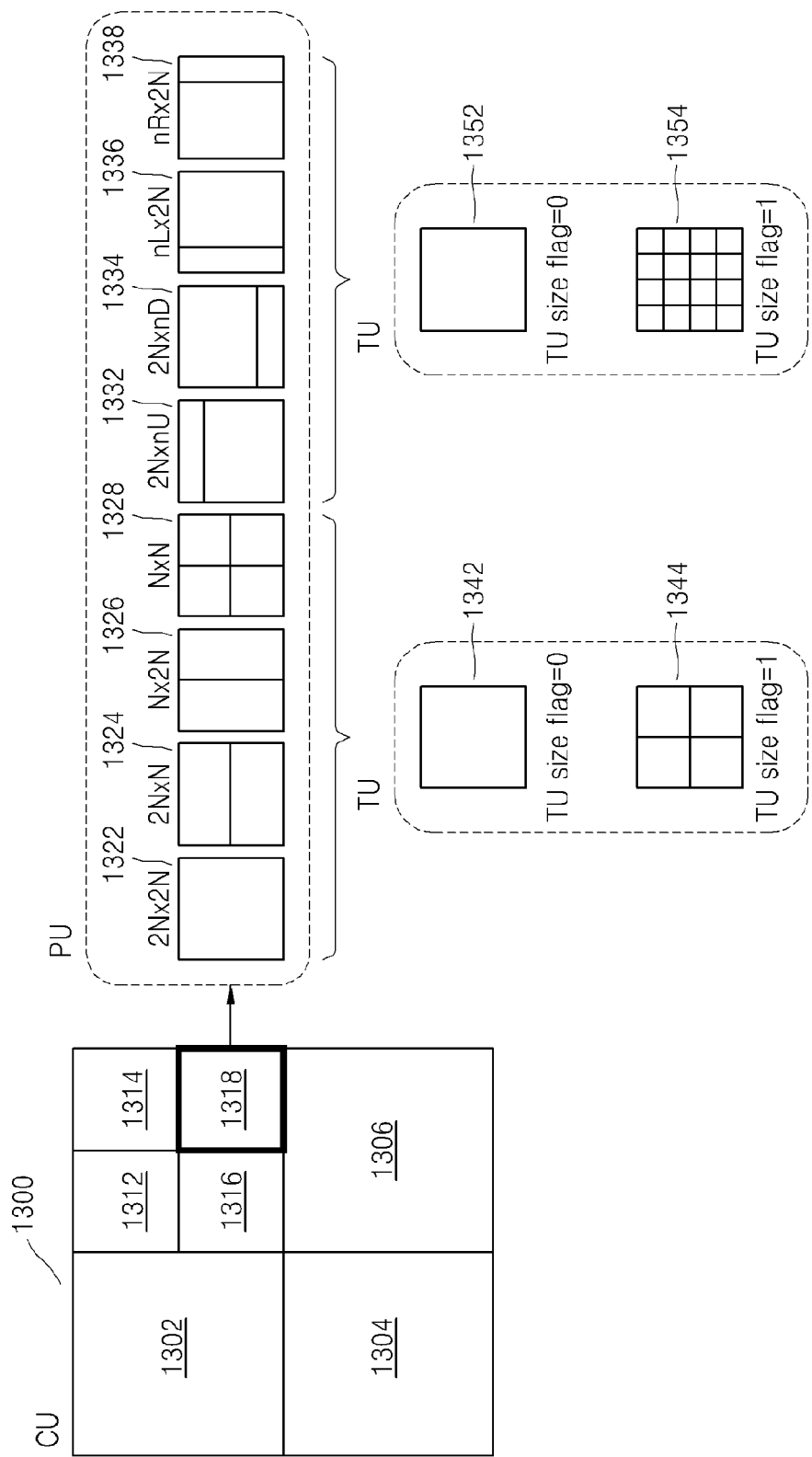
FIG. 13 is a diagram for describing a relationship between a coding unit, a prediction unit or a partition, and a transformation unit, according to encoding mode information of exemplary Table 1 below according to an exemplary embodiment.

FIG. 13 is a diagram for describing a relationship between a coding unit, a prediction unit or a partition, and a transformation unit, according to encoding mode information of exemplary Table 1, according to an exemplary embodiment.

Referring to FIG. 13, a maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0 and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, though it is understood that the TU size flag is not limited to 1 bit, and a transformation unit may be hierarchically split having a tree structure while the TU size flag increases from 0.

In this case, the size of a transformation unit that has been actually used may be expressed by using a TU size flag of a transformation unit, according to an exemplary embodiment, together with a maximum size and minimum size of the transformation unit. According to an exemplary embodiment, a video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, a video decoding apparatus 200 may decode video by using the maximum transformation unit size information, the minimum transformation unit size information, and the maximum TU size flag.

For example, if the size of a current coding unit is 64×64 and a maximum transformation unit size is 32×32, the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, the TU size flag may be 0 or 1. Here, the TU size flag cannot be set to a value other than 0 or 1.

Thus, if it is defined that the maximum TU size flag is MaxTransformSizeIndex, a minimum transformation unit size is MinTransformSize, and a transformation unit size is RootTuSize when the TU size flag is 0, a current minimum transformation unit size CurrMinTuSize that can be determined in a current coding unit, may be defined by Equation (1):

$$CurrMinTuSize = max(MinTransformSize, RootTuSize/(2^{MaxTransformSizeIndex})) \quad (1).$$

Compared to the current minimum transformation unit size CurrMinTuSize that can be determined in the current coding unit, a transformation unit size RootTuSize when the TU size flag is 0 may denote a maximum transformation unit size that can be selected in the system. In Equation (1), RootTuSize/(2^MaxTransformSizeIndex) denotes a transformation unit size when the transformation unit size RootTuSize, when the TU size flag is 0, is split a number of times corresponding to the maximum TU size flag. Furthermore, MinTransformSize denotes a minimum transformation size. Thus, a smaller value from among RootTuSize/(2^MaxTransformSizeIndex) and MinTransformSize may be the current minimum transformation unit size CurrMinTuSize that can be determined in the current coding unit.

According to an exemplary embodiment, the maximum transformation unit size RootTuSize may vary according to the type of a prediction mode.

For example, if a current prediction mode is an inter mode, then RootTuSize may be determined by using Equation (2) below. In Equation (2), MaxTransformSize denotes a maximum transformation unit size, and PUSize denotes a current prediction unit size.

$$RootTuSize = min(MaxTransformSize, PUSize) \quad (2).$$

That is, if the current prediction mode is the inter mode, the transformation unit size RootTuSize when the TU size flag is 0, may be a smaller value from among the maximum transformation unit size and the current prediction unit size.

If a prediction mode of a current partition unit is an intra mode, RootTuSize may be determined by using Equation (3) below. In Equation (3), PartitionSize denotes the size of the current partition unit.

$$RootTuSize = min(MaxTransformSize, PartitionSize) \quad (3).$$

That is, if the current prediction mode is the intra mode, the transformation unit size RootTuSize when the TU size flag is 0 may be a smaller value from among the maximum transformation unit size and the size of the current partition unit.

However, the current maximum transformation unit size RootTuSize that varies according to the type of a prediction mode in a partition unit is merely exemplary, and is not limited thereto in another exemplary embodiment.

Figure 14:
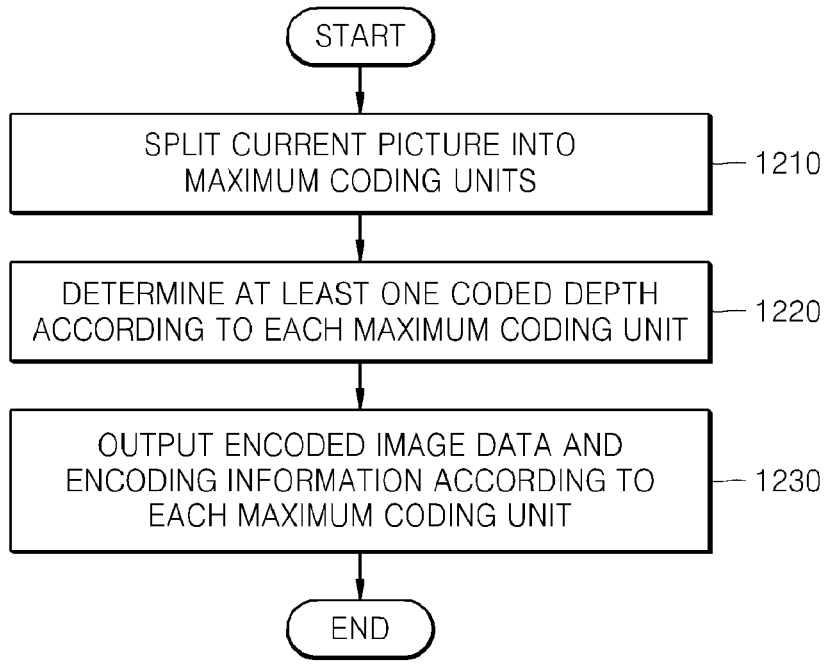
FIG. 14 is a flowchart illustrating a video encoding method, according to an exemplary embodiment.

FIG. 14 is a flowchart illustrating a method of encoding a video, according to an exemplary embodiment. Referring to FIG. 14, in operation 1210, a current picture is split into at least one maximum coding unit. A maximum depth indicating a total number of possible splitting times may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, a transformation unit according to partition types having the least encoding error is determined for each deeper coding unit. In order to determine a coded depth having a minimum encoding error in each maximum coding unit, encoding errors may be measured and compared in all deeper coding units according to depths.

In operation 1230, encoded image data that is the final encoding result according to the coded depth is output for each maximum coding unit, with encoding information about the coded depth and an encoding mode. The information about the encoding mode may include at least one of information about a coded depth or split information, information about a partition type of a prediction unit, a prediction mode, and a size of a transformation unit. The encoded information about the encoding mode may be transmitted to a decoder with the encoded image data.

Figure 15:
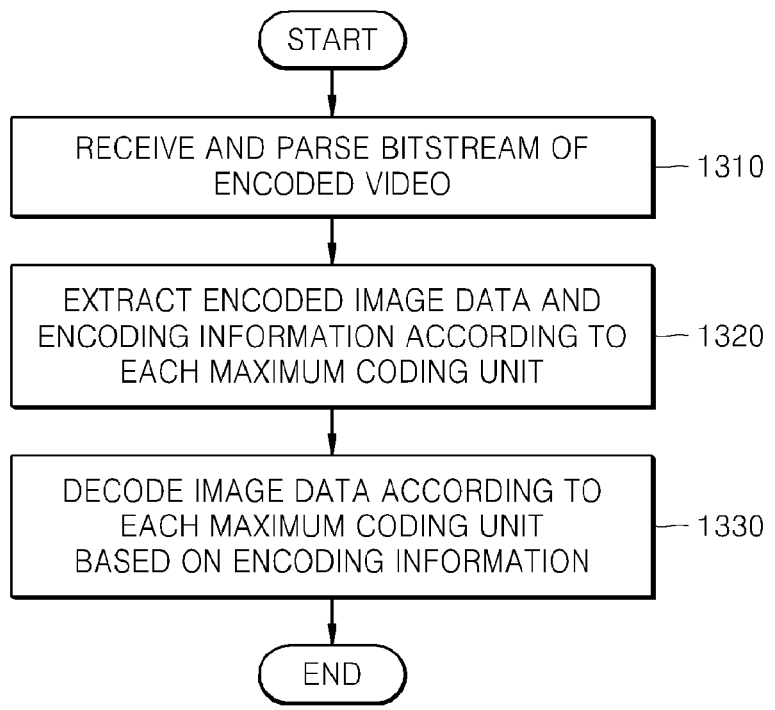
FIG. 15 is a flowchart illustrating a video decoding method, according to an exemplary embodiment.

FIG. 15 is a flowchart illustrating a method of decoding a video, according to an exemplary embodiment. Referring to FIG. 15, in operation 1310, a bitstream of an encoded video is received and parsed.

In operation 1320, encoded image data of a current picture assigned to a maximum coding unit and information about a coded depth and an encoding mode according to maximum coding units are extracted from the parsed bitstream. The coded depth of each maximum coding unit is a depth having the least encoding error in each maximum coding unit. In encoding each maximum coding unit, the image data is encoded based on at least one data unit obtained by hierarchically splitting each maximum coding unit according to depths.

According to the information about the coded depth and the encoding mode, the maximum coding unit may be split into coding units having a tree structure. Each of the coding units having the tree structure is determined as a coding unit corresponding to a coded depth, and is optimally encoded as to output the least encoding error. Accordingly, encoding and decoding efficiency of an image may be improved by decoding each piece of encoded image data in the coding units after determining at least one coded depth according to coding units.

In operation 1330, the image data of each maximum coding unit is decoded based on the information about the coded depth and the encoding mode according to the maximum coding units. The decoded image data may be reproduced by a reproducing apparatus, stored in a storage medium, or transmitted through a network.

Hereinafter, video encoding and decoding considering independent parsing or independent decoding in a coding unit level, according to exemplary embodiments of the present invention will be described with reference to FIGS. 16 through 30.

Figure 16:
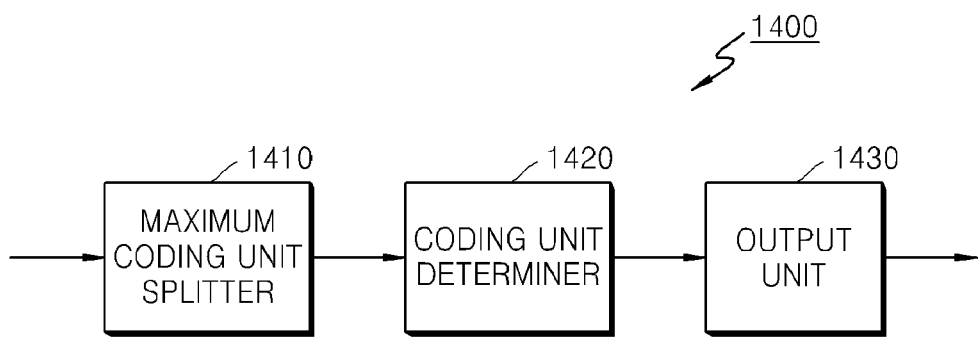
FIG. 16 is a block diagram of a video encoding apparatus for independent parsing and independent decoding in a coding unit level, according to an exemplary embodiment.

FIG. 16 is a block diagram of a video encoding apparatus 1400 for independent parsing and independent decoding in a coding unit level, according to an exemplary embodiment. Referring to FIG. 16, the video encoding apparatus 1400 includes a maximum coding unit splitter 1410, a coding unit determiner 1420, and an output unit 1430.

The maximum coding unit splitter 1410 splits a current picture into at least one maximum coding unit. Pixel value data of the maximum coding unit is output to the coding unit determiner 1420.

The coding unit determiner 1420 compresses and encodes the pixel value data of the maximum coding unit generated by the maximum coding unit splitter 1410. In detail, the coding unit determiner 1420 encodes deeper coding units in split regions that are obtained by hierarchically splitting the maximum coding unit according to depths. Each split region of the maximum coding unit is encoded at a current depth, and as a depth deepens, each split region is split again to generate new split regions. Accordingly, a process of encoding corresponding deeper coding units in the newly generated split region is recursively performed.

Encoding results obtained through a process recursively encoding deeper coding units in each split region of the maximum coding unit are compared, and a depth having a highest encoding efficiency is determined as an encoding depth of the corresponding split region. Since the depths having the highest encoding efficiency in split regions are independently determined from each other, at least one encoding depth may be determined in one maximum coding unit.

The coding unit determiner 1420 may perform parallel encoding on coding units per a predetermined number of coding units in a slice level. For example, B slices that refer to a same I or P slice are encoded in parallel per a predetermined number of coding units.

The coding unit determiner 1420 may perform independent encoding in a coding unit level. Accordingly, information about an adjacent coding unit may not be referred to so as to encode a current coding unit.

Since the coding unit determiner 1420 performs independent encoding in the coding unit level, the parallel encoding is performed on the coding units per the predetermined number of coding units. Coding units to be encoded at a next cycle according to the parallel encoding in the coding unit level may not be used as reference information to encode coding units to be encoded at a current cycle. Also, coding units to be encoded at the same cycle according to the parallel encoding in the coding unit level may not be used as reference information for each other.

A coding tool based on sequential encoding performs prediction encoding by referring to nearby information that is previously encoded according to a sequential order.

Accordingly, it may not be possible to use a coding tool based on the sequential encoding of coding units as it is, if the independent encoding is performed in the coding unit level. When the coding unit determiner 1420 independently performs intra prediction in the coding unit level, nearby information that may be referenced from among nearby information that is encoded before the coding unit may be searched for and referred to, if the reference information of a current coding unit is not about a previous coding unit encoded before the current coding unit. A method of referring to the nearby information that may be referenced from among the nearby information that is encoded before the coding unit, wherein the method is performed for the coding tool, will now be described.

When the coding unit determiner 1420 independently performs the intra prediction in the coding unit level, a direct current (DC) value obtained by using information encoded before the current coding unit from among nearby information of the current coding unit may be determined as a prediction value of the current coding unit, if the reference information of the current coding unit is not about the previous coding unit encoded before the current coding unit.

An intra prediction mode indicates a direction of nearby information that is referred to for intra prediction of the current coding unit. Accordingly, a plurality of intra prediction modes may be set based on a number of directions of nearby information that may be referenced by the current coding unit. When the coding unit determiner 1420 independently performs the intra prediction in the coding unit level, only an intra prediction mode indicating an intra prediction direction about the information encoded before the current coding unit from among the nearby information of the current coding unit may be compressed as a type of the intra prediction mode, if the reference information of the current coding unit is not about the previous coding unit encoded before the current coding unit.

The coding unit determiner 1420 may perform frequency domain prediction, which predicts a transformation coefficient of the current coding unit, by using a transformation coefficient of the adjacent coding unit in a frequency domain. When the coding unit determiner 1420 independently performs the frequency domain prediction in the coding unit level, the transformation coefficient of the current coding unit may be predicted by using the information encoded before the current coding unit from among the nearby information of the current coding unit.

A frequency domain prediction mode according to an exemplary embodiment may indicate a direction of the nearby information that is referred to by the current coding unit. When the coding unit determiner 1420 independently performs the frequency domain prediction in the coding unit level, a frequency domain prediction mode of the current coding unit may be changed to a prediction mode indicating a direction of the information encoded before the current coding unit from among the nearby information of the current coding unit, if the reference information of the current coding unit is not about the previous coding unit encoded before the current coding unit.

The coding unit determiner 1420 may search for information about a reference possibility of the adjacent coding unit so as to search for the reference information of the current coding unit for inter prediction. When the coding unit determiner 1420 independently performs inter prediction in the coding unit level, a motion vector between the adjacent coding unit and the current coding unit may be predicted based on a changed reference possibility from among the reference possibilities of the nearby information of the current coding unit, if the reference information of the current coding unit is not about the previous coding unit encoded before the current coding unit.

The coding unit determiner 1420 may perform a predetermined post process on a prediction value of the current coding unit, which is obtained by performing the intra prediction on the current coding unit. The coding unit determiner 1420 may revise the prediction value of the current coding unit by using various parameters and the nearby information according to a purpose of the post process. When the coding unit determiner 1420 independently performs the post process in the coding unit level after the intra prediction, a post processed pixel value of the current coding unit may be calculated by using a pixel value of the current coding unit and a post processed pixel value of the adjacent pixel value in encoded nearby information of the current coding unit, if the reference information of the current coding unit is not about the previous coding unit encoded before the current coding unit.

The coding unit determiner 1420 may perform entropy encoding according to context-based adaptive binary arithmetic coding (CABAC) using context information of nearby information of a coding unit. When the coding unit determiner 1420 independently performs the entropy encoding in the coding unit level, context information of the nearby information encoded before the current coding unit from among the nearby information of the current coding unit may not be referred to in some cases.

The output unit 1430 outputs a bitstream including video data encoded in the encoding depth determined for each maximum coding unit, and information about a coded depth and an encoding mode according to the maximum coding units. Also, the output unit 1430 inserts at least one of information indicating independent parsing of a data unit and information indicating independent decoding of a data unit into the bitstream for independent parsing or independent decoding in the coding unit level.

The information indicating independent decoding of the data unit may be set based on whether the data units are independently encoded, and the information indicating independent parsing of the data unit may be set based on whether the data units are independently inserted into the bitstream.

The data unit independently encoded may be a group of at least one coding unit or a group of at least one maximum coding unit. Regarding the data unit independently encoded, information indicating at least one of a size of the coding unit, the number of the group of at least one coding unit and the number of the group of at least one maximum coding unit may be encoded and inserted into the bitstream independently from other data unit.

Independent parsing and independent decoding of the data unit according to exemplary embodiments may respectively include independent parsing and independent decoding in a slice level, or independent parsing and independent decoding in a coding unit level. Accordingly, the information indicating independent parsing of the data unit may include at least one of information indicating independent parsing in the slice level and information indicating independent parsing in the coding unit level, and the information indicating independent decoding of the data unit may include at least one of information indicating independent decoding in the slice level and information indicating independent decoding in the coding unit level.

The information indicating independent parsing of the data unit and the information indicating independent decoding of the data unit may be independently set from each other. Accordingly, a combination of the information indicating independent parsing of the data unit and the information indicating independent decoding of the data unit may be (true, false), (false, true), (true, true), or (false, false) based on whether independent parsing or independent decoding is performed during encoding.

The information indicating independent parsing of the data unit or the information indicating independent decoding of the data unit may be stored in a slice header or a sequence parameter set.

The output unit 1430 may insert information indicating whether to perform partial region decoding independently from other than data unit of the partial region or information indicating the target data unit of the partial region decoding into the bitstream.

The video encoding apparatus 1400 may independently encode a coding unit based on nearby information. Since the video encoding apparatus 1400 encodes data in a coding unit having a size of, for example, 32×32, 64×64, 128×128, 256× 256, or the like, which is larger than a related art macroblock having a size of 8×8 or 16×16, the video encoding apparatus 1400 may perform prediction encoding on a current coding unit by using data included in one coding unit. Accordingly, the video encoding apparatus 1400 is capable of performing independent encoding in the coding unit level, wherein the prediction encoding is independently performed on each coding unit.

Also, if a plurality of arithmetic processors capable of performing independent encoding on coding units exist, a plurality of coding units may be encoded in parallel. Accordingly, via the independent encoding in the coding unit level, a decoder may perform independent parsing or independent decoding on the coding units, and may perform parallel parsing and parallel decoding on the coding units.

Figure 17:
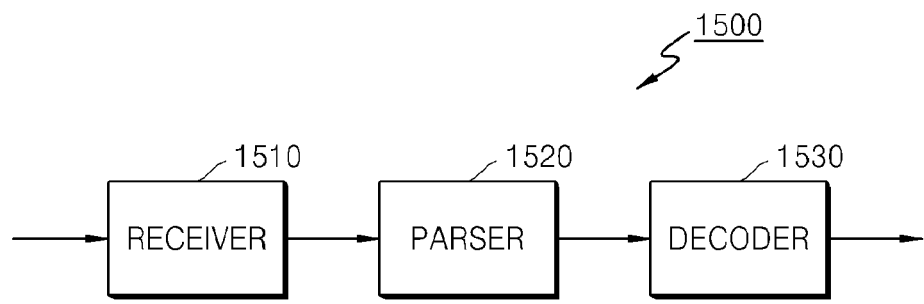
FIG. 17 is a block diagram of a video decoding apparatus according to independent parsing and independent decoding in a coding unit level, according to an exemplary embodiment.

FIG. 17 is a block diagram of a video decoding apparatus 1500 according to independent parsing and independent decoding in a coding unit level, according to an exemplary embodiment. Referring to FIG. 17, the video decoding apparatus 1500 includes a receiver 1510, a parser 1520, and a decoder 1530. The receiver 1510 receives a bitstream of an encoded video. The receiver 1510 extracts at least one of information indicating independent parsing of a data unit and information indicating independent decoding of a data unit from the received bitstream.

The information indicating independent parsing of the data unit and the information indicating independent decoding of the data unit are separately set from each other, and thus may be separately extracted. The information indicating independent parsing of the data unit and the information indicating independent decoding of the data unit may be extracted from a slice header of the bitstream or a sequence parameter set.

Performing of independent parsing or independent encoding may be defined in a slice level or a coding unit level. For example, the information indicating independent parsing of the data unit and the information indicating independent decoding of the data unit may respectively include information indicating independent parsing in a slice level and information indicating independent decoding in a slice level, or information indicating independent parsing in a coding unit level and information indicating independent decoding in a coding unit level.

Due to characteristics of an I slice, a P slice, and a B slice, the I slice may refer to nearby information to perform intra prediction on a current coding unit in some cases, and the P and B slices may not refer to the nearby information for intra prediction in some cases. Accordingly, performance of the independent parsing or the independent decoding in the slice level may be higher when used in the P and B slices than when used in the I slice.

The parser 1520 extracts encoded information by parsing the bitstream according to data units based on the information indicating independent parsing of the data unit. For example, if a bitstream about a video that is encoded considering parsing in a coding unit level is received, the parser 1520 parses each maximum coding unit and extracts encoded video data, information about a coded depth, and information about an encoding mode of a corresponding maximum coding unit.

The data unit, which is parsing or decoding independently from other data units, may be a group of at least one coding unit or a group of at least one maximum coding unit. Regarding the data unit of independent parsing or decoding, information indicating at least one of a size of the coding unit, the number of the group of at least one coding unit or the number of the group of at least one maximum coding unit may be also independently parsed and extracted from the bitstream.

The decoder 1530 may independently decode the encoded video data of each coding unit, which is parsed and extracted by the parser 1520, based on the information indicating independent decoding of the data unit, which is extracted by the parser 1520. The encoded video data may be decoded in each coding unit corresponding to at least one encoding depth in the maximum coding unit, based on information about an encoding depth and an encoding mode of each coding unit corresponding to at least one encoding depth, according to maximum coding units.

An arithmetic processor may perform independent parsing or independent decoding according to data units. Accordingly, if there are a plurality of arithmetic processors, the arithmetic processors may continuously and simultaneously perform independent parsing and independent decoding on different data units. Thus, a parallel process may be performed on a plurality of data units based on the independent parsing and independent decoding according to the data units. A current data unit is decoded by referring to only data units, which are parsed and decoded prior to the current data unit according to the parallel process, among nearby data units.

A decoding tool based on sequential decoding decodes a current coding unit by referring to information about a previous coding unit that is pre-decoded according to a sequential order. Accordingly, the bitstream received by the video decoding apparatus 1500 may include data that is independently encoded according to data units, and thus it may not be possible to restore original data by using the decoding tool based on sequential decoding of coding units as is.

If predetermined nearby information for performing prediction decoding on a coding unit may not be referenced since the predetermined nearby information is not decoded before the current coding unit, the decoder 1530 may perform prediction decoding on the current coding unit by searching for and referring to nearby information that may be referenced by the current coding unit, according to the independent parsing or independent decoding of the data unit.

When the decoder 1530 performs independent intra prediction in a coding unit level, a DC value calculated by using nearby information, which may be currently referenced by the current coding unit, other than current nearby information may be determined as a prediction value of the current coding unit, if the current nearby information for performing intra prediction on the current coding unit may not be referenced.

Alternatively, when the decoder 1530 performs the independent intra prediction in the coding unit level, intra prediction may be performed in an intra prediction direction mode that is compressed only in an intra prediction direction of the nearby information, which may be currently referenced by the current coding unit, other than current nearby information, if the current nearby information for performing intra prediction on the current coding unit may not be referenced.

Thus, if the current data unit is independently parsed or decoded based on the information indicating independent parsing of the data unit or the information indicating independent decoding of the data unit, current nearby information is limited by the independent parsing and decoding of the current data unit. Data units other than the current nearby information may be not referred for performing inter(intra) prediction/compensation on the current data unit. When the decoder 1530 performs independent frequency domain prediction in the coding unit level, a transformation coefficient of the current coding unit may be restored by using an adjacent coding unit, which may be currently referenced by the current coding unit, other than current nearby information, if the current nearby information for performing frequency domain prediction on the current coding unit may not be referenced.

Specifically, a frequency domain prediction mode of a coding unit in encoding information may indicate a direction of the current nearby information to be referred to by the coding unit. Accordingly, if the current nearby information of the coding unit may not be referenced, the decoder 1530 may restore the transformation coefficient of the current coding unit according to the frequency domain prediction mode that is changed to indicate a direction of the adjacent coding unit, which may be currently referenced by the current coding unit, other than the current nearby information.

When the decoder 1530 performs independent inter prediction in the coding unit level and reference possibilities of adjacent coding units for performing inter prediction on the current coding unit are changed, a motion vector about an adjacent coding unit that is accessible based on the changed reference possibilities may be used for inter prediction on the current coding unit.

When current nearby information of the current coding unit for performing a post process after the independent intra prediction in the coding unit level is not restored before the current coding unit, the decoder 1530 may perform the post process on an intra prediction value of the current coding unit by using a restored pixel value that may be currently referenced from among adjacent restored pixel values of the current coding unit, other than the current nearby information.

When the decoder 1530 performs independent entropy decoding according to CABAC in the coding unit level, context information of an adjacent coding unit may not be referenced by the current coding unit, if the current nearby information of the current coding unit may not be referenced.

Since the decoder 1530 independently decodes the coding units, the decoder 1530 is able to decode only at least one maximum coding unit corresponding to a partial region of the encoded video data. Accordingly, only a partial area of an encoded video may be selectively decoded. If the parser 1520 extract information indicating whether to perform partial region decoding or information indicating target data unit of the partial region decoding from the bitstream, the decoder 1530 may determine whether to perform partial region decoding according to information indicating whether to perform partial region decoding, and perform decoding on data unit of the partial region corresponding to information indicating target data unit of the partial region decoding, independently from other than coding units of the partial region. For example, information indicating target data unit of the partial region decoding may include at least one of index of a maximum coding unit or a coding unit to be partially decoded and a range of maximum coding units or coding units to be partially decoded.

Also, since the decoder 1530 independently decodes the coding units in parallel, video data that is decoded in parallel in a coding unit level may be restored and reproduced in parallel in a maximum coding unit level. Time may be delayed when a display device reproduces pixels of a large-scale coding unit. Furthermore, when the display device sequentially reproduces coding units, time may be delayed to a considerable extent for a picture to be reproduced. Accordingly, when the display device processes and reproduces video data independently in coding units, which are decoded and restored in parallel in the coding unit level by the video decoding apparatus 1500, in parallel, reproduction time delay in the display device may be reduced.

Since the video decoding apparatus 1500 decodes data in a large coding unit, various types of image information may be included in one coding unit. Accordingly, the video encoding apparatus 1400 and the video decoding apparatus 1500 according to exemplary embodiments may perform encoding and decoding to reduce temporally or spatially overlapping data of the coding unit by making use of information about one coding unit independently from other coding units. Accordingly, the video encoding apparatus 1400 and the video decoding apparatus 1500 respectively performs encoding and decoding independently according to coding units in the coding unit level.

Figures 18, 19:
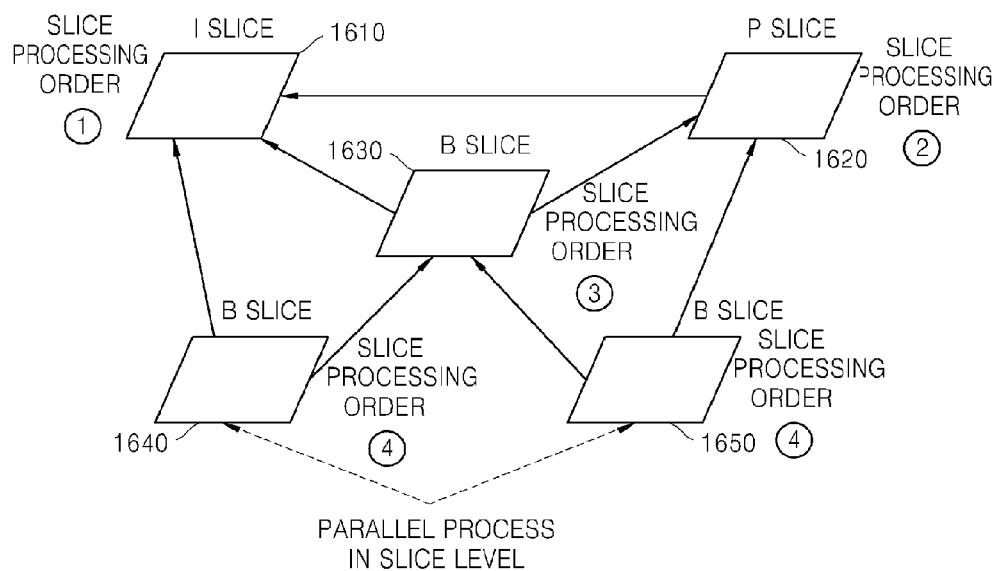
FIG. 18 is an outline for describing a parallel process in a slice level according to a H.264 standard encoding and decoding method.
FIG. 19 is a table showing possible combinations of a parallel process in a slice level, and a parallel process in a coding unit level according to one or more exemplary embodiments.

FIG. 18 is an outline for describing a parallel process in a slice level according to a H.264 standard encoding and decoding method.

The H.264 standard encoding and decoding method supports parallel process in a frame or slice level. Referring to FIG. 18, an I slice 1610 is decoded without referring to another slice. Since a P slice 1620 refers to the I slice 1610, the P slice 1620 is decoded after the I slice 1610. Since a B slice 1630 refers to the I and P slices 1610 and 1620, the B slice 1630 is decoded after the I and P slices 1610 and 1620.

Since a B slice 1640 refers to the I and B slices 1610 and 1630, the B slice 1640 is decoded after the I and B slices 1610 and 1630, and since a B slice 1650 refers to the P and B slices 1620 and 1630, the B slice 1650 is decoded after the P and B slices 1620 and 1630. The B slices 1640 and 1650, which do not refer to each other, may be processed in parallel. Since such B slices 1640 and 1650 that are processed in parallel do not have slice dependence, the B slices 1640 and 1650 may be processed regardless of a slice processing order.

FIG. 19 is a table showing possible combinations of a parallel process in a slice level, and a parallel process in a coding unit level according to one or more exemplary embodiments.

A video encoding apparatus 1400 and a video decoding apparatus 1500 according to exemplary embodiments may perform a hierarchical parallel process to a data unit in a level smaller than a slice level. Also, independent parsing and independent decoding for the parallel process may be separately set. Similarly, parallel parsing and parallel decoding according to coding units may be separately set.

Referring to the table of FIG. 19, the hierarchical parallel process may not only employ Case 1, wherein a parallel process is possible only to a slice level as in the H.264 standard encoding and decoding method, but may also selectively combine parallel parsing in a coding unit level or parallel decoding in a coding unit level as shown in Case 2 and Case 3. Although not shown in FIG. 19, the video encoding apparatus 1400 and the video decoding apparatus 1500 may realize a case where all of the parallel process in the slice level, the parallel parsing in the coding unit, and the parallel decoding in the coding unit are employed.

Also, the video decoding apparatus 1500 may also selectively perform parallel parsing and parallel decoding in the coding unit without performing the parallel process in the slice level, as in Case 4 or Case 5.

Parsing is an operation for reading a symbol in a bitstream and decoding is an operation of generating a restoration sample. Accordingly, arithmetic operations and throughputs of the decoding is more than those of the parsing, in the coding unit level. Accordingly, considering performance improvement in terms of throughput through the parallel process, Case 3 may be employed where sequential parsing and parallel decoding are performed.

Also, if quality deterioration of a predicted image is of concern due to independent decoding in the coding unit level, Case 1 or Case 2 may be employed where parallel parsing and sequential decoding are performed in the coding unit level.

Accordingly, the video encoding apparatus 1400 may selectively perform the independent encoding and the parallel encoding of the coding units while considering at least one of hardware performance for encoding and decoding, user's requirements, transmission environment, etc. Also, the video decoding apparatus 1500 may perform independent parsing or independent decoding and parallel parsing or parallel decoding on encoded video data based on whether independent encoding or parallel encoding is performed on the encoded video data.

Figure 20:
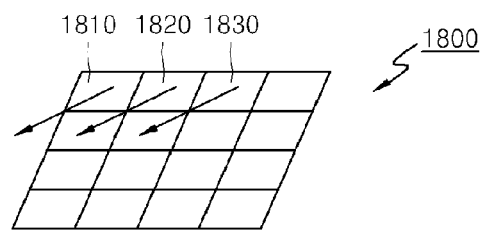
FIG. 20 is a diagram for describing a parallel process in a coding unit level, according to an exemplary embodiment.

FIG. 20 is a diagram for describing a parallel process in a coding unit level, according to an exemplary embodiment. Referring to FIG. 20, a video encoding apparatus 1400 and a video decoding apparatus 1500 according to exemplary embodiments may divide a picture 1800 into maximum coding units, and independently process the maximum coding units according to coding units. The video encoding apparatus 1400 may independently encode the maximum coding units in a coding unit level, or may simultaneously encode a predetermined number of maximum coding units in parallel. For example, three maximum coding units 1810 through 1830 may be simultaneously encoded at one cycle according to the parallel encoding.

Upon receiving a bitstream that is independently encoded in a coding unit level, the video decoding apparatus 1500 independently parses or decodes coding units. For example, when a bitstream that is encoded according to parallel encoding is to be decoded, parallel parsing or parallel decoding may be performed on data about the three maximum coding units 1810 through 1830.

Figure 21:
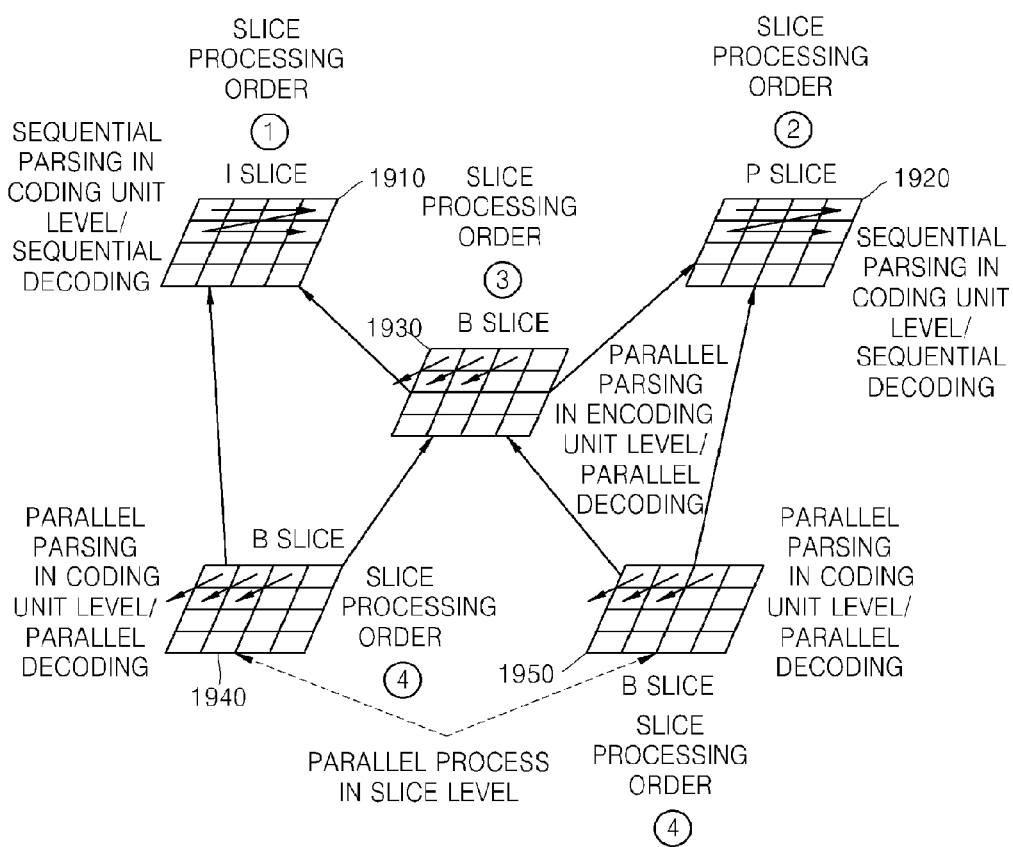
FIG. 21 is a diagram for describing a hierarchical parallel process in a data unit, according to an exemplary embodiment.

FIG. 21 is a diagram for describing a hierarchical parallel process in a data unit, according to an exemplary embodiment.

A video encoding apparatus 1400 according to an exemplary embodiment may individually set parallel processes in a coding unit level according to slices. For example, referring to FIG. 21, since an I slice 1910, a P slice 1920, and a B slice 1930 are to be referred to by each other, the I, P, and B slices 1910, 1920, and 1930 are not processed in parallel. Also, since B slices 1940 and 1950 are not referred to by each other, the B slices 1940 and 1950 are not processed in parallel. Accordingly, the I slice 1910 is decoded first, the P slice 1920 is decoded second, the B slice 1930 is decoded third, and the B slices 1940 and 1950 are decoded fourth in relation to each other.

Also, even when the parallel process is performed in the slice level, a sequential process or a parallel process may be selectively performed in a coding unit level according to the hierarchical parallel process. For example, sequential parsing and sequential decoding may be performed on the I and P slices 1910 and 1920 in the coding unit level, and parallel parsing and parallel decoding may be performed on the B slices 1930 through 1950 in the coding unit level.

Also, as described above, the parallel parsing and the parallel decoding may be separately set in the coding unit level. That is, a combination of parallel parsing and sequential decoding or a combination of sequential parsing and parallel decoding may be selected in the coding unit level for a slice.

Figure 22:
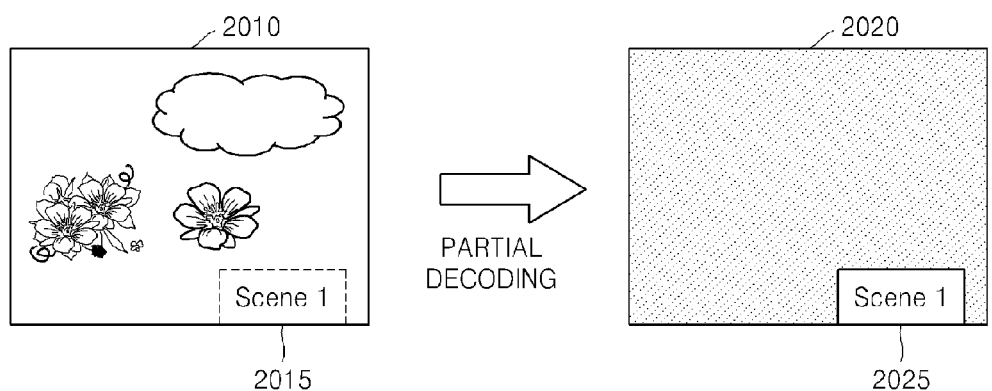
FIG. 22 is a diagram for describing possible partial decoding according to independent decoding in a coding unit level, according to an exemplary embodiment.

FIG. 22 is a diagram for describing possible partial decoding according to independent decoding in a coding unit level, according to an exemplary embodiment.

Referring to FIG. 22, a video encoding apparatus 1400 according to an exemplary embodiment independently encodes video data 2010 in a coding unit level. A video decoding apparatus 1500 according to an exemplary embodiment receives a bitstream that is independently encoded in a coding unit, and restores the video data 2010 by independently parsing or decoding the bitstream in a coding unit level.

Accordingly, if the video decoding apparatus 1500 is to decode only a partial region 2015 of the video data 2010, maximum coding units corresponding to the partial region 2015 may be independently decoded and restored. Accordingly, a result image 2020 restored by the video decoding apparatus 1500 may include a partially restored partial region 2025.

Figure 23:
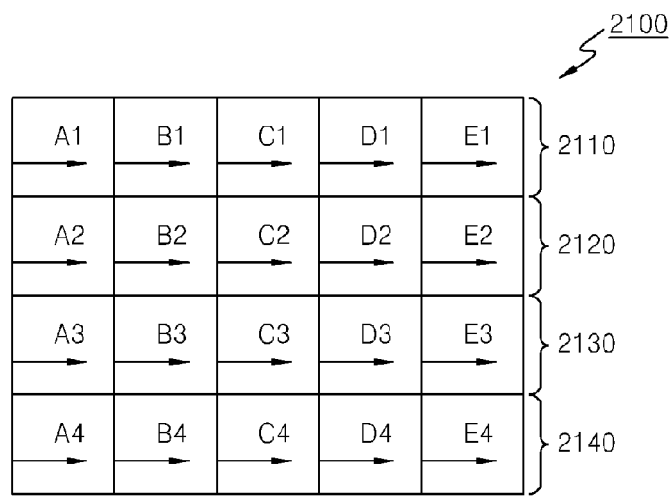
FIG. 23 is a diagram of a possible parallel display in a coding unit according to parallel decoding in a coding unit level, according to an exemplary embodiment.

FIG. 23 is a diagram of a possible parallel display in a coding unit according to parallel decoding in a coding unit level, according to an exemplary embodiment.

Video data encoded in a coding unit level by a video encoding apparatus 1400 according to an exemplary embodiment may be decoded in parallel per a predetermined number of coding units by a video decoding apparatus 1500 according to an exemplary embodiment. A display device receives video signals of the coding units decoded and restored in parallel, and reproduce the coding units in parallel.

For example, referring to FIG. 23, the video decoding apparatus 1500 independently decodes and restores a picture 2100 including maximum coding units A1 through A4, B1 through B4, C1 through C4, D1 through D4, and E1 through E4 in a coding unit level.

The video decoding apparatus 1500 according to the present exemplary embodiment may decode and restore five consecutive maximum coding units in a horizontal direction, in parallel. A group 2110 of the maximum coding units A1 through E1 may be decoded and restored at a first processing cycle, a group 2120 of the maximum coding units A2 through E2 may be decoded and restored at a second processing cycle, a group 2130 of the maximum coding units A3 through E3 may be decoded and restored at a third processing cycle, and a group 2140 of the maximum coding units A4 through E4 may be decoded and restored at a fourth processing cycle. Here, in order to reproduce the picture 2100, a display device may reproduce the restored maximum coding units A1 through A4, B1 through B4, C1 through C4, D1 through D4, and E1 through E4 in the restored order in parallel per the five consecutive maximum coding units.

Alternatively, in another exemplary embodiment, the video decoding apparatus 1500 may decode and restore four consecutive maximum coding units in a vertical direction, in parallel. In this case, a group of the maximum coding units A1 through A4 may be decoded and restored at a first processing cycle, a group of the maximum coding units B1 through B4 may be decoded and restored at a second processing cycle, a group of the maximum coding units C1 through C4 may be decoded and restored at a third processing cycle, a group of the maximum coding units D1 through D4 may be decoded and restored at a fourth processing cycle, and a group of the maximum coding units E1 through E4 may be decoded and restored at a fifth processing cycle. Here, in order to reproduce the picture 2100, the display device may reproduce the restored maximum coding units A1 through A4, B1 through B4, C1 through C4, D1 through D4, and E1 through E4 in the restored order in parallel per the four consecutive maximum coding units.

FIG. 24 is a syntax of a sequence parameter set 2200 into which information indicating independent parsing in a coding unit level and information indicating independent decoding in a coding unit level are inserted, according to an exemplary embodiment. A sequence_parameter_set as used herein denotes the syntax of the sequence parameter set 2200 about a current image slice. In FIG. 24, the information indicating independent parsing in the coding unit level and the information indicating independent decoding in the coding unit level are inserted into the syntax of the sequence parameter set 2200 about the current image slice.

Furthermore, in FIG. 24, picture_width indicates a height of an input image, max_coding_unit_size indicates a size of a maximum coding unit, and max_coding_unit_depth denotes a maximum depth.

Information (i.e., use_independent_cu_decode_flag) indicating independent decoding in a coding unit level, information (i.e., use_independent_cu_parse_flag) indicating independent parsing in a coding unit level, information (i.e., use_mv_accuracy_control_flag) indicating availability of a control operation on motion vector accuracy, information (i.e., use_arbitrary_direction_intra_flag) indicating availability of an intra prediction operation in arbitrary directionality, information (i.e., use_frequency_domain_prediction_flag) indicating availability of a prediction encoding and decoding operation for frequency transformation, information (i.e., use_rotational_transform_flag) indicating availability of a rotational transformation operation, information (i.e., use_tree_significant_map_flag) indicating availability of encoding and decoding using a tree significant map, information (i.e., use_multi_parameter_intra_prediction_flag) indicating availability of an intra prediction encoding operation using a multi parameter, information (i.e., use_advanced_motion_vector_prediction_flag) indicating availability of an improved motion vector prediction encoding operation, information (i.e., use_adaptive_loop_filter_flag) indicating availability of an adaptive loop filtering operation, information (i.e., use_quadtree_adaptive_loop_filter_flag) indicating availability of an adaptive loop filtering operation in a quadtree structure, information (i.e., use_delta_qp_flag) indicating availability of a quantization operation using a deta value of a quantization parameter, information (i.e., use_random_noise_generation_flag) indicating availability of a random noise generation operation, and information (i.e., use_arbitrary_motion_partition_flag) indicating availability of a motion prediction operation according to a prediction unit that is split in arbitrary shaped partitions may be defined as examples of a sequence parameter. The syntaxes indicating availability of various operations enable effective encoding and decoding by defining whether a corresponding operation is used while encoding and decoding a current slice.

Specifically, a filter length (i.e., alf_filter_length) of an adaptive loop filter, a type (i.e., alf_filter_type) of the adaptive loop filter, a reference value Q bits (i.e., alf_qbits) for quantizing a coefficient of the adaptive loop filter, and a number (i.e., alf_num_color) of color components in the adaptive loop filter may be defined in the sequence parameter set 2200 according to the use_adaptive_loop_filter_flag and the use_quadtree_adaptive_loop_filter_flag.

Information about a correspondence relationship between a depth of a coding unit, a coding tool, and an operation mode, which is used by a video encoding apparatus 1400 and a video decoding apparatus 1500 according to exemplary embodiments, may include an operation mode (i.e., mvp_mode[uiDepth]) of inter prediction corresponding to a depth (i.e., uiDepth) of a coding unit, and an operation mode (i.e., significant_map_mode[uiDepth]) indicating a type of a significant map from among the tree significant map. That is, a correspondence relationship between inter prediction and a corresponding operation mode or between encoding and decoding using the tree significant map and a corresponding operation mode, according to the depth of the coding unit, may be set in the sequence parameter set 2200.

A bit depth of an input sample (i.e., input_sample_bit_depth) and a bit depth of an internal sample (i.e., internal_sample_bit_depth) may also be set in the sequence parameter set 2200.

The video decoding apparatus 1500 may extract the use_independent_cu_decode_flag and the use_independent_cu_parse_flag by reading the sequence parameter set 2200, and determine whether to perform independent parsing or independent decoding in the coding unit level in a corresponding sequence.

The use_independent_cu_decode_flag and the use_independent_cu_parse_flag, which are set, encoded, and decoded by the video encoding apparatus 1400 and the video decoding apparatus 1500, may be inserted into the sequence parameter set 2200 of FIG. 24 and may also be set, encoded, and decoded in a unit of slices, frames, pictures, or GOPs.

When the use_independent_cu_parse_flag is included in a slice header, independent parsing may be performed in the coding unit level in a corresponding slice if the use_independent_cu_parse_flag is "true," and related sequential parsing may be performed in the corresponding slice if the use_independent_cu_parse_flag is "false."

Also, when the use_independent_cu_decode_flag is included in the slice header, independent decoding may be performed in the coding unit level in a corresponding slice if the use_independent_cu_decode_flag is "true," and related art sequential decoding may be performed in the corresponding slice if use_independent_cu_decode_flag is "false."

Figure 25:
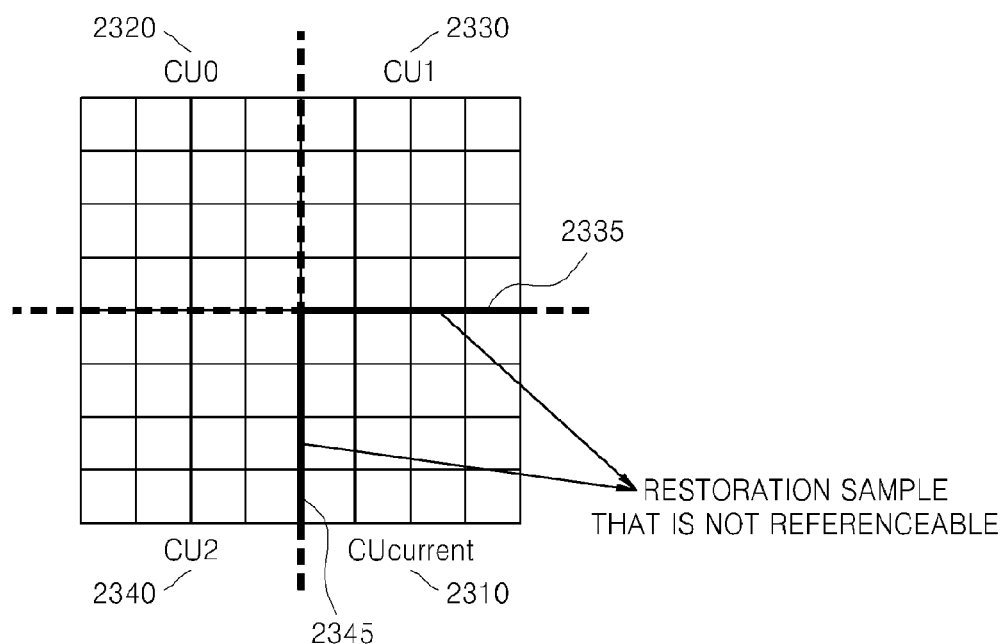
FIG. 25 is a diagram for describing intra prediction for independent decoding in a coding unit level, according to an exemplary embodiment.

FIG. 25 is a diagram for describing intra prediction for independent decoding in a coding unit level, according to an exemplary embodiment.

Referring to FIG. 25, a video decoding apparatus 1500 according to an exemplary embodiment may perform intra prediction in an arbitrary direction on a current coding unit 2310 while considering directions of adjacent coding units 2320, 2330, and 2340 with respect to the current coding unit. The intra prediction in the arbitrary direction calculates an intra prediction value of the current coding unit 2310 according to extrapolation that uses restoration samples of the adjacent coding units 2320, 2330, and 2340 of the current coding unit 2310.

According to independent decoding in a coding unit level, the restoration samples of the adjacent coding units 2330 and 2340 respectively disposed on boundaries 2335 and 2345 of the current coding unit 2310 may not be referenced. If pixel values on the boundary 2335 between the current coding unit 2310 and the adjacent coding unit 2330 above the current coding unit 2310 may not be referenced because the adjacent coding unit 2330 is not yet decoded, only intra prediction may be performed by referring to pixel values on the boundary 2345 between the current coding unit 2310 and the adjacent coding unit 2340 on the left of the current coding unit 2310. For example, a DC value of the pixel values on the boundary 2345 may be calculated as an intra prediction value of the current coding unit 2310.

Similarly, if the pixel values on the boundary 2345 between the current coding unit 2310 and the adjacent coding unit 2340 may not be referenced because the adjacent coding unit 2340 is not yet decoded, intra prediction may be performed by referring to the pixel values on the boundary 2335 between the current coding unit 2310 and the adjacent coding unit 2330. For example, a DC value of the pixel values on the boundary 2335 may be calculated as the intra prediction value of the current coding unit 2310.

Also, if both of the adjacent coding units 2330 and 2340 may not be referenced because the adjacent coding units 2330 and 2340 are not yet decoded, a predetermined DC value may be selected as the intra prediction value of the current coding unit 2310 or an intra prediction mode of the current coding unit 2310 may be set as an impossible prediction mode.

Alternatively, a video encoding apparatus 1400 according to an exemplary embodiment may independently perform the intra prediction in arbitrary directionality on the current coding unit 2310 without referring to the adjacent coding units 2320, 2330, and 2340 of the current coding unit 2310.

The video encoding apparatus 1400 may perform frequency domain prediction. According to the frequency domain prediction, a prediction value of a transformation coefficient of a current coding unit in a frequency domain may be calculated by using restoration samples of adjacent coding units. Accordingly, the video decoding apparatus 1500 is able to perform prediction decoding in the frequency domain. The transformation coefficient of the current coding unit in the frequency domain may be restored by using the restoration samples of the adjacent coding units.

A frequency domain prediction mode is defined according to a direction of nearby information being referred to. For example, when nearby information in a vertical direction is referred to, the frequency domain prediction mode (i.e., FDP_mode) is set to 0 (i.e., FDP_mode=0), and when nearby information in a horizontal direction is referred to, the frequency domain prediction mode is set to 1 (i.e., FDP_mode=1). Also, by way of example, in a coding unit complying with a DC intra prediction mode, the frequency domain prediction mode is set to 2 (i.e., FDP_mode=2), and when both of the nearby information in the vertical direction and the horizontal direction is referred to, the frequency domain prediction mode is set to 3 (i.e., FDP_mode=3).

In order for the video encoding apparatus 1400 to restore the transformation coefficient of the current coding unit by using nearby information, a restoration sample of a previous coding unit that is decoded before the current coding unit is referred to. However, if reference information used to restore the transformation coefficient of the current coding unit is a sample that may not be referenced according to independent encoding in a coding unit level, the video decoding apparatus 1500 may use an accessible restoration sample from among the nearby information.

For example, if a transformation coefficient of an independent upper coding unit may not currently be referenced according to independent encoding in a coding unit level, the video encoding apparatus 1400 changes a frequency domain prediction mode to FDP_mode=1 that refers to nearby information in a horizontal direction so as to refer to information about a left coding unit. Similarly, if a transformation coefficient of the left coding unit may not currently be referenced, the video encoding apparatus 1400 changes the frequency domain prediction mode to FDP_mode=0 that refers to nearby information in a vertical direction so as to refer to the transformation coefficient of the upper coding unit.

However, if the current coding unit is a maximum coding unit, the frequency domain prediction is not performed.

If the use_independent_cu_decode_flag or the use_independent_cu_parse_flag is determined to be "true," and independent parsing or independent decoding is employed in a coding unit level, the video decoding apparatus 1500 may perform decoding according to independent frequency domain prediction in the coding unit level. However, current nearby information may be unable to be referred to according to independent parsing or independent decoding in the coding unit level.

Encoding information that is inserted into a bitstream and transmitted by the video encoding apparatus 1400 may include a frequency domain prediction mode (i.e., FDP_mode) that is adjusted to indicate nearby information that may be referenced for frequency domain prediction independently performed in the coding unit level. Accordingly, the video decoding apparatus 1500 may extract the encoding information from the bitstream and perform frequency domain prediction decoding independently in the coding unit level according to a frequency domain prediction mode in the encoding information.

Figure 26:
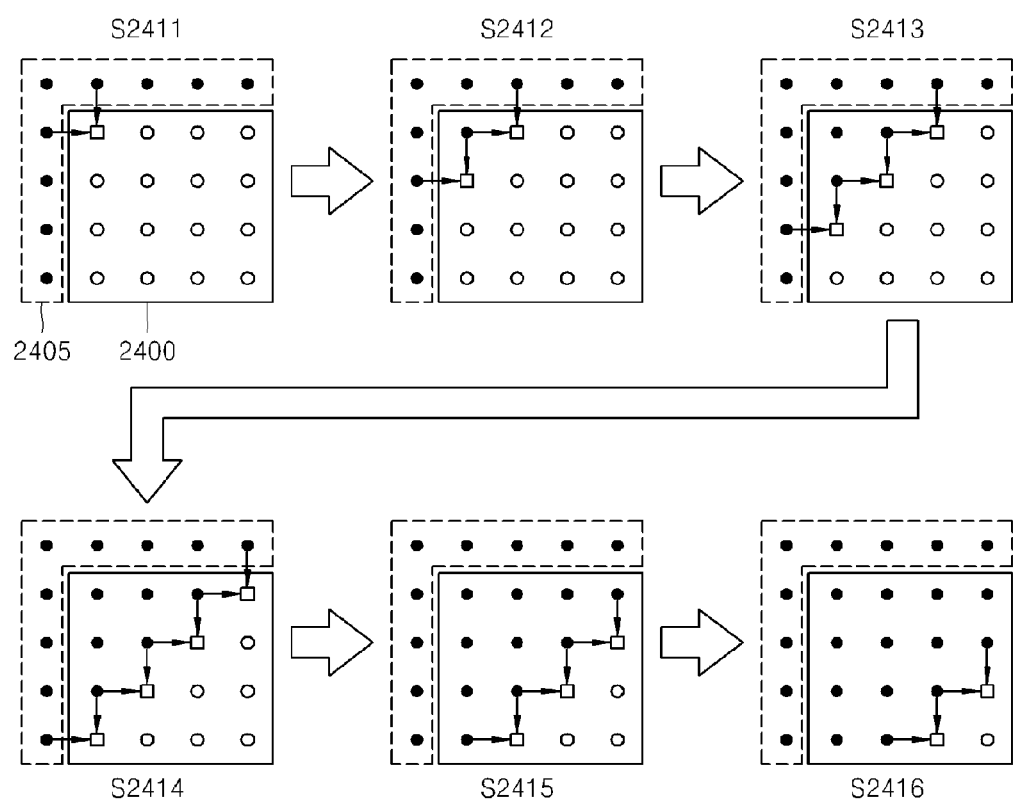
FIG. 26 is a diagram for describing a post process of intra prediction using a nearby restoration sample, according to an exemplary embodiment.

FIG. 26 is a diagram for describing a post process of intra prediction using a nearby restoration sample, according to an exemplary embodiment.

When independent encoding in a coding unit level is not considered, a video encoding apparatus 1400 according to an exemplary embodiment may perform multi parameter intra prediction, which performs a post process on an intra prediction value of a current coding unit, by using restoration samples of adjacent coding units of the current coding unit as multi parameters.

Referring to FIG. 26, white circular pixels of a current coding unit 2400 are samples of an intra prediction value, and black circular pixels in an area 2405 around the current coding unit 2400 are nearby restoration samples. In operation S2411, an upper left pixel is post processed by using an upper nearby restoration sample and a left nearby restoration sample. A post processed restoration sample of the current coding unit 2400 is shown in a white square pixel.

As shown in operations S2412 through 2416, an intra prediction value of a current pixel is post processed by using the upper or left nearby restoration samples (black circular pixels) of the current pixel or the post processed restoration sample (white square pixel) of the current coding unit 2400.

Figure 27:
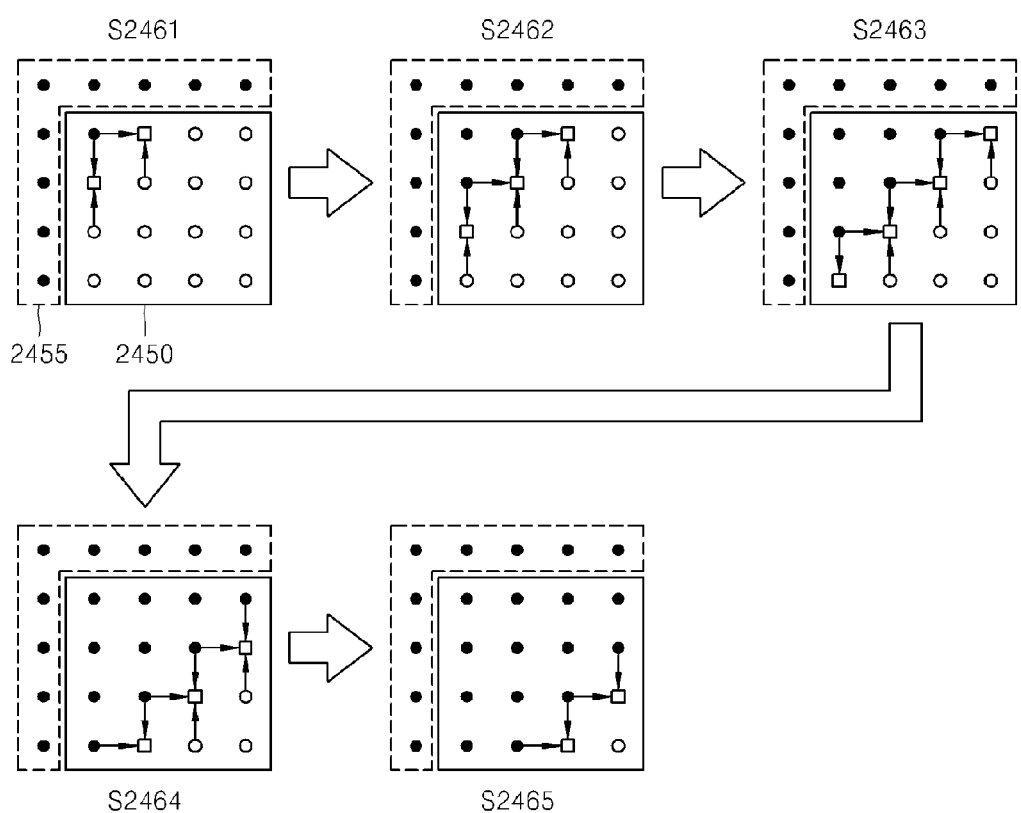
FIG. 27 is a diagram for describing a post process of intra prediction for independent decoding in a coding unit level, according to an exemplary embodiment.

FIG. 27 is a diagram for describing a post process of intra prediction for independent decoding in a coding unit level, according to an exemplary embodiment.

When a video encoding apparatus 1400 according to an exemplary embodiment performs independent encoding in a coding unit level, restoration samples of adjacent coding units of a current coding unit may not be referenced, and thus a parameter for multi parameter intra prediction may be changed.

Referring to FIG. 27, white circular pixels of a current coding unit 2450 are samples of an intra prediction value, and black circular pixels in an area 2455 around the current coding unit 2450 are nearby restoration samples. Here, the nearby restoration samples in the area 2455 may not be referenced according to independent encoding in a coding unit level.

Here, since an upper left pixel is unable to refer to an upper nearby restoration sample and a left nearby restoration sample, the video encoding apparatus 1400 determines a current DC value as a post process value in operation S2461. Also, a right pixel and a lower pixel of the post processed upper left pixel may be post processed by using the post processed upper left pixel and a lower pixel respectively below the right pixel and the lower pixel.

Similarly, as shown in operations S2462 through 2465, the intra prediction value of the current pixel may be post processed by using post processed restoration samples from among upper, left, and lower pixels of the current pixel in the current coding unit 2450.

If a nearby restoration sample of a current coding unit may not be referenced according to independent parsing or independent decoding in a coding unit level, a video decoding apparatus 1500 according to an exemplary embodiment may use post processed restoration samples from among upper, left, and lower pixels of a current pixel in the current coding unit so as to post process an intra prediction value of the current coding unit.

Figure 28:
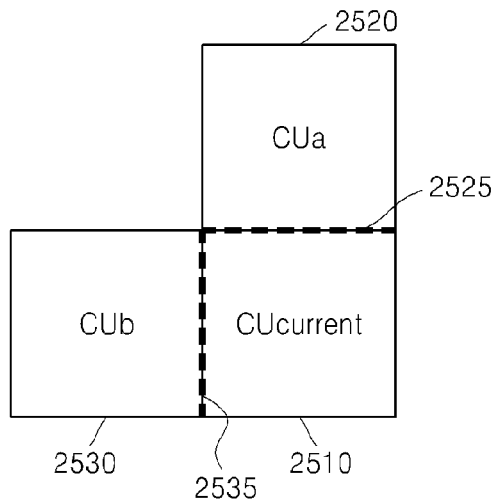
FIG. 28 is a diagram for describing entropy encoding and decoding complying with a context-adaptive binary arithmetic coding (CABAC) method, for independent decoding in a coding unit level according to an exemplary embodiment, and independent parsing in a coding unit level according to an exemplary embodiment.

FIG. 28 is a diagram for describing entropy encoding and decoding complying with a CABAC method, for independent decoding in a coding unit level according to an exemplary embodiment, and independent parsing in a coding unit level according to an exemplary embodiment.

In order to perform the entropy encoding complying with the CABAC method, a video encoding apparatus 1400 according to an exemplary embodiment may refer to pixels of a current coding unit, and pixels on boundaries between the current coding unit and an upper coding unit and between the current coding unit and a left coding unit.

When the independent decoding is performed in the coding unit level, the video encoding apparatus 1400 is unable to refer to restoration samples of adjacent coding units of the current coding unit so as to perform the entropy encoding complying with the CABAC method.

For example, referring to FIG. 28, a boundary 2525 between an upper coding unit (CUa) 2520 and a current coding unit (CUcurrent) 2510, and a boundary 2535 between a left coding unit Cub 2530 and the CUcurrent 2510 may be referred to so as to perform entropy encoding on the CUcurrent 2510 according to sequential encoding in the coding unit level.

However, pixels of the boundaries 2525 and 2535 may not be referred to perform the entropy encoding on the CUcurrent 2510 according to the independent encoding in the coding unit level. Also, restoration samples on the boundaries 2525 and 2535 may not be referenced to perform the entropy decoding on the CUcurrent 2510 even according to the entropy decoding in the coding unit level.

Figure 29:
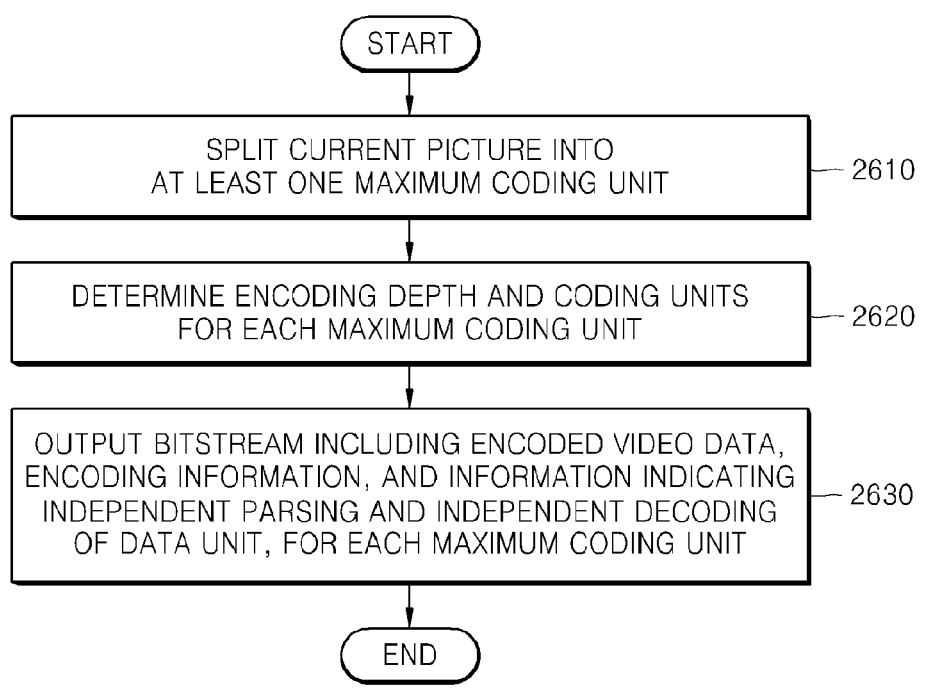
FIG. 29 is a flowchart illustrating a video encoding method for independent parsing or independent decoding, according to an exemplary embodiment.

FIG. 29 is a flowchart illustrating a video encoding method for independent parsing or independent decoding, according to an exemplary embodiment. Referring to FIG. 29, in operation 2610, a current picture is split into at least one maximum coding unit. In operation 2620, at least one encoding depth and corresponding coding unit are determined for each of the at least one maximum coding unit by encoding at least one split region generated as a depth deepens. According to the method, independent encoding in a coding unit level, which does not refer to nearby information to encode a current coding unit, is possible. Also, in an arithmetic environment that simultaneously supports a plurality of arithmetic processors, the independent encoding, wherein each of coding units are independently encoded based on nearby information, and parallel encoding, wherein a plurality of coding units are simultaneously encoded in parallel, may be realized.

In operation 2630, a bitstream including encoded video data and information about a coded depth and an encoding mode according to maximum coding units may be output for each maximum coding unit. At least one of information indicating independent parsing of a data unit, and information indicating independent decoding of a data unit may be inserted into the bitstream. Specifically, information indicating whether the independent parsing or independent encoding in the coding unit level is supported may be inserted into and output with the bitstream.

Figure 30:
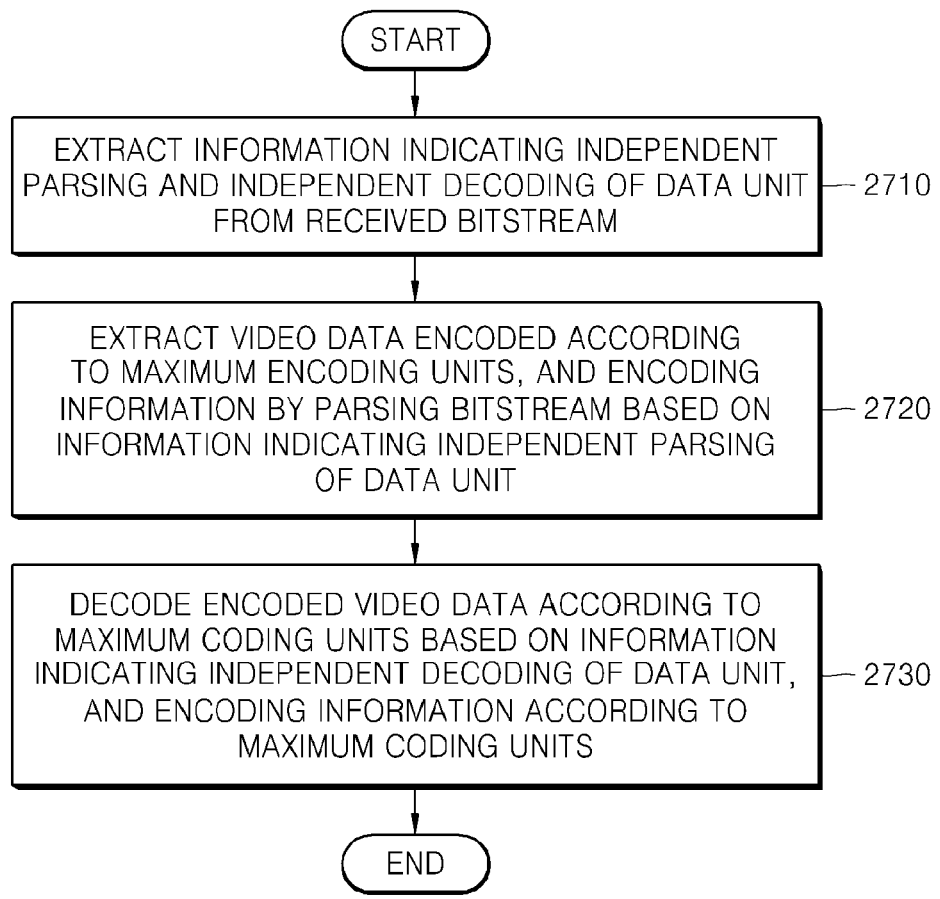
FIG. 30 is a flowchart illustrating a video decoding method according to independent parsing or independent decoding, according to an exemplary embodiment.

FIG. 30 is a flowchart illustrating a video decoding method according to independent parsing or independent decoding, according to an exemplary embodiment. Referring to FIG. 30, in operation 2710, a bitstream of an encoded video is received, and at least one of information indicating independent parsing of a data unit and information indicating independent decoding of the data unit is extracted from the bitstream. The information indicating independent parsing and independent decoding of the data unit may be extracted from a slice header, a sequence parameter set, or information according to coding units.

Independent parsing or independent decoding of the data unit may be independent parsing or independent decoding in a slice level or in a coding unit level.

In operation 2720, the bitstream is parsed based on the information indicating independent parsing of the data unit, and video data encoded according to maximum coding units and encoding information are extracted from the bitstream. The encoding information may include information about at least one encoding depth in a corresponding maximum coding unit, and information about an encoding mode according to coding units of the at least one encoding depth. For example, if the information indicating independent parsing of the data unit is "true," a symbol of a current coding unit may be parsed without referring to nearby information.

In operation 2730, a coding unit according to at least one coded depth is decoded according to maximum coding units of the encoded video data, based on the information indicating independent decoding of the data unit, and information about a coded depth and an encoding mode according to maximum coding units. If the information indicating independent decoding of the data unit defines independent decoding in a coding unit level, the encoded video data according to the maximum coding units may be decoded without referring to information about adjacent coding units.

Nearby information that is referred to so as to decode a current coding unit by using a decoding tool using sequential decoding may not be accessible according to independent decoding. Here, reference information for the current coding unit may be changed so as to perform prediction decoding on the current coding unit by referring to currently accessible information.

According to an exemplary embodiment, since a large coding unit may be used, prediction encoding and decoding may be performed on a current coding unit without having to refer to nearby information. Also, a decoder using a plurality of arithmetic processors may be realized as hardware performance improves and hardware cost is decreased. Accordingly, parallel decoding may be performed in a coding unit level as each of the arithmetic processors simultaneously perform independent parsing and independent decoding in the coding unit level on different coding units.

While not restricted thereto, one or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, while not required in all exemplary embodiments, one or more units of the video encoding apparatus 100 or 1400 and the video decoding apparatus 200 or 1500 can include a processor or microprocessor executing a computer program stored in a computer-readable medium.

While exemplary embodiments have been particularly shown and described with reference to the drawings, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the present inventive concept.

What is claimed is:

1. A method of determining a motion vector, the method comprising:
   splitting a picture into a plurality of maximum coding units according to information about a maximum size of a coding unit;
   obtaining, from a bitstream, split information indicating whether to divide a coding unit into smaller coding units, in a maximum coding unit among the plurality of maximum coding units;
   determining at least one coding unit which is not split any more based on the split information, and determining partitions from the at least one coding unit;
   obtaining, from the bitstream, information about a data area for parallel motion prediction in a maximum coding unit among the plurality of maximum coding units;
   determining a data area using the information about a data area;
   when the data area includes a current partition among the partitions and a neighboring block of the current partition, determining the neighboring block as an unavailable block; and
   generating a motion vector of the current partition using a motion vector of a block among motion vector prediction candidate blocks excluding the unavailable block,
   wherein the neighboring block is previously decoded according to a decoding order and the current partition and the neighboring block are not included in one coding unit,
   wherein the determining partitions from the at least one coding unit comprises, when the split information indicates a non-split for a coding unit among the at least one coding unit which is not split any more, determining the partitions by dividing the coding unit, and inter prediction is performed on the partitions, and
   wherein when the split information indicates a non-split for a coding unit among the at least one coding unit which is not split any more, transformation units are determined by dividing the coding unit, and inverse-transformation is performed on the transformation units.

2. The method of claim 1, the method further comprising:
   when the current partition and the neighboring block are included respectively in different data areas determined according to the information, determining the neighboring block as an available block.

* * * * *